(12) United States Patent
Robinson et al.

(10) Patent No.: US 9,227,852 B2
(45) Date of Patent: Jan. 5, 2016

(54) APPARATUS, SYSTEMS, AND METHODS FOR WATER TREATMENT

(75) Inventors: B. Keel Robinson, Richmond, CA (US);
Reid H. Bowman, Ojai, CA (US);
Stephen R. McAdams, San Ramon, CA (US)

(73) Assignee: McWong Environmental Technology, Sacramento, CA (US)

( * ) Notice: Subject to any disclaimer, the term of this patent is extended or adjusted under 35 U.S.C. 154(b) by 1218 days.

(21) Appl. No.: 12/933,851

(22) PCT Filed: Mar. 20, 2009

(86) PCT No.: PCT/US2009/001761
§ 371 (c)(1),
(2), (4) Date: Apr. 18, 2011

(87) PCT Pub. No.: WO2009/117141
PCT Pub. Date: Sep. 24, 2009

(65) Prior Publication Data
US 2011/0186495 A1    Aug. 4, 2011

Related U.S. Application Data

(60) Provisional application No. 61/070,288, filed on Mar. 21, 2008, provisional application No. 61/072,991, filed on Apr. 3, 2008.

(51) Int. Cl.
*C02F 1/72* (2006.01)
*C02F 1/78* (2006.01)
(Continued)

(52) U.S. Cl.
CPC .............. *C02F 1/006* (2013.01); *B01F 3/0446* (2013.01); *B01F 5/048* (2013.01); *B01F 5/0473* (2013.01);
(Continued)

(58) Field of Classification Search
CPC ............ C02F 1/006; C02F 1/722; C02F 1/78; C02F 9/00; C02F 2301/043; C02F 2303/04; C02F 2101/305; C02F 2101/306; C02F 2101/345; C02F 2101/36; C02F 2101/38; C02F 2209/03; B01F 3/0446; B01F 5/0473; B01F 5/0475; B01F 5/0478; B01F 5/048; B01F 5/0615; B01F 5/0619; B01F 5/0646; B01F 5/0647; B01F 2003/04886; B01F 2005/0625; B01F 2005/0636
USPC ........................................................ 210/759
See application file for complete search history.

(56) References Cited

U.S. PATENT DOCUMENTS 5,273,664 A    12/1993 Schulz
5,492,633 A    2/1996 Moniwa et al.
(Continued)

OTHER PUBLICATIONS

GDT Corporation, "The GDT™ Process", GDT Process Presentation Materials; 20 pages.
(Continued)

*Primary Examiner* — Lucas Stelling
(74) *Attorney, Agent, or Firm* — Jacqueline F. Mahoney; Judy M. Mohr; McDermott Will & Emery LLP

(57) ABSTRACT

An apparatus, system, and method relating to a modular water treatment apparatus that utilizes sidestream injection coupled to static mixing are described. The apparatus, system, and method utilizes ozone, with or without hydrogen peroxide, for effective disinfection and/or decontamination of contaminants present in waste water. The disinfected, decontaminated water is suitable for reuse.

15 Claims, 26 Drawing Sheets

(51) Int. Cl.
| | |
|---|---|
| B01F 3/04 | (2006.01) |
| B01F 5/04 | (2006.01) |
| B01F 5/06 | (2006.01) |
| C02F 9/00 | (2006.01) |
| C02F 1/00 | (2006.01) |
| C02F 101/30 | (2006.01) |
| C02F 101/34 | (2006.01) |
| C02F 101/36 | (2006.01) |
| C02F 101/38 | (2006.01) |

(52) U.S. Cl.
CPC ............. *B01F 5/0475* (2013.01); *B01F 5/0478* (2013.01); *B01F 5/0615* (2013.01); *B01F 5/0619* (2013.01); *B01F 5/0646* (2013.01); *B01F 5/0647* (2013.01); *C02F 1/722* (2013.01); *C02F 1/78* (2013.01); *B01F 2003/04886* (2013.01); *B01F 2005/0625* (2013.01); *B01F 2005/0636* (2013.01); *C02F 9/00* (2013.01); *C02F 2101/305* (2013.01); *C02F 2101/306* (2013.01); *C02F 2101/345* (2013.01); *C02F 2101/36* (2013.01); *C02F 2101/38* (2013.01); *C02F 2209/003* (2013.01); *C02F 2301/043* (2013.01); *C02F 2303/04* (2013.01)

(56) References Cited

U.S. PATENT DOCUMENTS

| | | | | |
|---|---|---|---|---|
| 5,578,205 | A | * | 11/1996 | Martin .......................... 210/199 |
| 5,851,407 | A | | 12/1998 | Bowman et al. |
| 5,888,403 | A | * | 3/1999 | Hayashi ........................ 210/695 |
| 6,024,882 | A | | 2/2000 | McNeilly et al. |
| 7,018,529 | B2 | * | 3/2006 | Furukawa et al. ......... 210/167.3 |

OTHER PUBLICATIONS

International Search Report from related PCT Patent Application No. PCT/US2009/001761 mailed on May 13, 2009, application published as WO 2009/117141 A1 on Sep. 24, 2009.

Jackson, et al., "Retrofit of ozone installations with side stream injection and degasification", GDT Water Process Corporation, 12 pages.

Jackson, et al., "Retrofit of counter current bubble column contactor with injectors and mixing nozzles", GDT Water Process Corporation, 13 pages.

Mazzei, et al., "Mass transfer of high concentration ozone with high efficiency injectors and degassing separators", GDT Corporation, Presented at International Ozone Association Pan American Group 1995 Annual Conference, 15 pages (1995).

Meyer, et al., "The effect of ozone demand on mass transfer efficiency and its importance to in-line ozone contractor design", Mazzei Injector Corporation, 11 pages.

Mysore, et al., "Selection of an ozone dissolution system for the Tampa Bay Regional Water Treatment Plant", US Filter, 22 pages.

Mysore, et al., "Improvement of the ozonation process through the use of static mixers", Awwa Research Foundation, Project #2537, Awwa Research Foundation, Online Abstract, 2 pages, Accessed on Jan. 27, 2004.

Overbeck, et al., "Innovative deoxygenation of ozonated water"; GDT Corporation, Presented at the International Ozone Association World Congress 1999 Annual Conference, 8 pages.

* cited by examiner

| | | | | Conditions | | | | | | Calculated Value | | | | | | Time | | |
|---|---|---|---|---|---|---|---|---|---|---|---|---|---|---|---|---|---|---|
| Sample ID# | Run # | Ozone Dose (ppm) | Mole Ratio | H2O2 Conc (wt%) | Reactor Volume (L) | Ozone Conc. (wt%) | Oxygen Flowrate (mls/min) | Oxygen Density (g/L) | mg Ozone | mMoles Ozone | mg H2O2 | mMoles H2O2 | H2O2 (ppm) | Volume H2O2 (mls) | STEP#1 Ozone Addition Time (seconds) | STEP#2 Additional Contact Time Before Sampling (seconds) | Total Time (seconds) |
| P2170-SP-0 | 0 | 0.0 | 0.00 | 0.00 | 0.0 | 0.0 | 0.0 | 1.328 | 0.0 | 0.000 | 0.000 | 0.000 | 0.000 | 0.00 | 0 | 0 | 0 |
| P2170-SP-D1-1A | 1A | 5.1 | 0.70 | 0.50 | 2.2 | 10.08 | 83.0 | 1.328 | 11.1 | 0.231 | 5.509 | 0.162 | 2,504 | 1.10 | 60 | 0 | 60 |
| P2170-SP-D1-1B | 1B | 5.0 | 0.70 | 0.50 | 2.2 | 10.07 | 83.0 | 1.328 | 11.1 | 0.231 | 5.504 | 0.162 | 2,502 | 1.10 | 60 | 0 | 60 |
| P2170-SP-5-2A | 2A | 5.0 | 0.00 | 0.00 | 2.2 | 10.02 | 82.0 | 1.328 | 11.0 | 0.229 | 0.000 | 0.000 | 0.000 | 0.00 | 60 | 180 | 240 |
| P2170-SP-5-2B | 2B | 5.0 | 0.00 | 0.00 | 2.2 | 10.09 | 82.0 | 1.328 | 11.0 | 0.229 | 0.000 | 0.000 | 0.000 | 0.00 | 60 | 180 | 240 |
| P2170-SP-10-3A | 3A | 10.0 | 0.00 | 0.00 | 2.2 | 10.01 | 166.0 | 1.328 | 22.0 | 0.458 | 0.000 | 0.000 | 0.000 | 0.00 | 60 | 180 | 240 |
| P2170-SP-10-3B | 3B | 10.0 | 0.00 | 0.00 | 2.2 | 10.05 | 166.0 | 1.328 | 22.0 | 0.458 | 0.000 | 0.000 | 0.000 | 0.00 | 60 | 180 | 240 |
| P2170-SP-15-4A | 4A | 15.0 | 0.00 | 0.00 | 2.2 | 9.97 | 249.0 | 1.328 | 33.0 | 0.688 | 0.000 | 0.000 | 0.000 | 0.00 | 60 | 180 | 240 |
| P2170-SP-15-4B | 4B | 15.0 | 0.00 | 0.00 | 2.2 | 10.02 | 249.0 | 1.328 | 33.0 | 0.688 | 0.000 | 0.000 | 0.000 | 0.00 | 60 | 180 | 240 |
| P2170-SP-5X-5A | 5A | 5.0 | 0.35 | 0.50 | 2.2 | 9.94 | 83.0 | 1.328 | 11.0 | 0.229 | 2.727 | 0.080 | 1,240 | 0.55 | 60 | 0 | 60 |
| P2170-SP-5X-5B | 5B | 5.0 | 0.35 | 0.50 | 2.2 | 9.97 | 83.0 | 1.328 | 11.0 | 0.229 | 2.727 | 0.080 | 1,240 | 0.55 | 60 | 0 | 60 |
| P2170-SP-5Y-6A | 6A | 5.0 | 0.70 | 0.50 | 2.2 | 9.96 | 83.0 | 1.328 | 11.0 | 0.229 | 5.454 | 0.160 | 2,479 | 1.09 | 60 | 0 | 60 |
| P2170-SP-5Y-6B | 6B | 5.0 | 0.70 | 0.50 | 2.2 | 9.98 | 83.0 | 1.328 | 11.0 | 0.229 | 5.454 | 0.160 | 2,479 | 1.09 | 60 | 0 | 60 |

Fig. 25

| Sample ID # | Run # | Ozone Dose (ppm) | H2O2:O3 Mole Ratio | TSS (mg/L) SM 2540D | BOD (mg/L) SM 5210B | TOC (mg/L) SM 5310C | Total Nitrogen, Kjeldahl (mg/L) EPA 351.4 | UVT Field | Y-Screen Bioassay LL Amber w/AA and Sodium Azide Luradan Equivalents (ng/L) | Y-Screen Bioassay LL Amber (no preservative) Luradan Equivalents (ng/L) | Total Coliform (org/100 mL) SM20 9223B | Fecal Coliform (org/100 mL) SM20 9223B | E. Coli (org/100 mL) SM20 9223B | pH Field | Alkalinity (mg/L) Field | Temperature (deg C) Field | Turbidity (NTU) Field | Ozone Residual @ 60 seconds Indigo Method Field | Ozone Residual @ 60 seconds DPD Method Field | Ozone Residual @ 140 seconds Indigo Method Field | Ozone Residual @ 140 seconds DPD Method Field | Hydrogen Peroxide Residual Field |
|---|---|---|---|---|---|---|---|---|---|---|---|---|---|---|---|---|---|---|---|---|---|---|
| P2170-SP-0 | 0 | 0.0 | 0.00 | ND (<4) | 6 | 5.1 | 1 | 79.7 | | 0.84 | 12000 | | SM20 9223B | 7.73 | 240 | 5.1 | 0.9 | | | | | Field |
| P2170-D1-BLANK | 0 | 0.0 | 0.00 | ND (<4) | 6 | | | | ND (<0.03) | | | | ND (<1) | 7.93 | | 8.8 | | | | | | |
| P2170-SP-D1-1A | 1A | 5.1 | 0.70 | | | | | 84.5 | | | | | ND (<1) | 7.54 | | 13.9 | | 1.0 | 1.3 | | | 2.0 |
| P2170-SP-D1-1B | 1B | 5.0 | 0.70 | | | | | 85.5 | ND (<0.10) | | | | | 6.30 | | 10.5 | | 1.0 | 1.3 | | | 2.0 |
| P2170-SP-S-2A | 2A | 5.0 | 0.00 | | | | | 61.7 | | | | | 1 | 7.43 | | 10.6 | | 1.0 | 1.9 | 0.6 | 1.2 | |
| P2170-SP-S-2B | 2B | 5.0 | 0.00 | | | | | 61.7 | ND (<0.03) | | | | | 7.57 | | 12.2 | | 1.0 | 1.9 | 0.6 | 1.2 | |
| P2170-SP-10-3A | 3A | 10.0 | 0.00 | | | | | 49.9 | | | | | ND (<1) | 7.57 | | 12.6 | | >1.6 | >2.3 | >1.6 | >2.3 | |
| P2170-SP-10-3B | 3B | 10.0 | 0.00 | | | | | 49.9 | ND (<0.03) | | | | | 7.58 | | 12.0 | | >1.6 | >2.3 | >1.6 | >2.3 | |
| P2170-SP-15-4A | 4A | 15.0 | 0.00 | | | | | 49.9 | | | | | | 7.60 | | 11.9 | | 1.2 | 1.3 | >1.6 | >2.3 | 0.5 |
| P2170-SP-15-4B | 4B | 15.0 | 0.00 | | | | | 56.5 | ND (<0.05) | | | | 6 | 7.64 | | 10.3 | | 0.6 | 1.0 | | | 0.5 |
| P2170-SP-5X-5A | 5A | 5.0 | 0.35 | | | | | 89.2 | | | | | | 7.64 | | 11.5 | | 0.6 | 1.0 | | | 1.0 |
| P2170-SP-5X-5B | 5B | 5.0 | 0.35 | | | | | 89.9 | ND (<0.05) | | | | 4 | 7.61 | | 11.5 | | 0.6 | 0.8 | | | 1.0 |
| P2170-SP-Y-6A | 6A | 5.0 | 0.70 | | | | | | | | | | | | | | | | | | | |
| P2170-SP-Y-6B | 6B | 5.0 | 0.70 | | | | | | | | | | | | | | | | | | | |

| Sample ID # | Run # | Ozone Dose (ppm) | H2O2:O3 Mole Ratio | Gemfibrozil (ng/L) @IDC7SCR | Ibuprofen (ng/L) @IDC7SCR | Triclosan (ng/L) @IDC7SCR | Caffeine (ng/L) @IDC7SCR | Fluoxetine (ng/L) @IDC7SCR | Sulfamethoxazole (ng/L) @IDC7SCR | Trimethoprim (ng/L) @IDC7SCR | Ethynyl Estradiol -17 Alpha (ng/L) @IDC7SCR | Impromine (ng/L) @IDC7SCR |
|---|---|---|---|---|---|---|---|---|---|---|---|---|
| P2170-SP-0 | 0 | 0.0 | 0.00 | 116 | 36 | 13 | 45 | 20 | 523 | 76 | | |
| P2170-D1-BLANK | 0 | 0.0 | 0.00 | ND (<1.0) | ND (<1.0) | ND (<5.0) | ND (<3.0) | ND (<1.0) | ND (<1.0) | ND (<1.0) | ND (<5.0) | ND (<5.0) |
| P2170-SP-D1-1A | 1A | 5.1 | 0.70 | ND (<1.0) | ND (<1.0) | ND (<5.0) | ND (<3.0) | ND (<1.0) | ND (<1.0) | ND (<1.0) | ND (<5.0) | ND (<5.0) |
| P2170-SP-D1-1B | 1B | 5.0 | 0.70 | ND (<1.0) | 6.7 | ND (<5.0) | ND (<3.0) | ND (<1.0) | ND (<1.0) | ND (<1.0) | 40 | 5.1 |
| P2170-SP-S-2A | 2A | 5.0 | 0.00 | ND (<1.0) | ND (<1.0) | ND (<5.0) | ND (<3.0) | ND (<1.0) | ND (<1.0) | ND (<1.0) | 43 | 9.6 |
| P2170-SP-S-2B | 2B | 5.0 | 0.00 | ND (<1.0) | ND (<1.0) | ND (<5.0) | ND (<3.0) | ND (<1.0) | ND (<1.0) | ND (<1.0) | ND (<5.0) | ND (<5.0) |
| P2170-SP-10-3A | 3A | 10.0 | 0.00 | ND (<1.0) | ND (<1.0) | 6.6 | ND (<3.0) | ND (<1.0) | ND (<1.0) | ND (<1.0) | 34 | 6.4 |
| P2170-SP-10-3B | 3B | 10.0 | 0.00 | ND (<1.0) | ND (<1.0) | ND (<5.0) | ND (<3.0) | ND (<1.0) | ND (<1.0) | ND (<1.0) | | |
| P2170-SP-15-4A | 4A | 15.0 | 0.00 | ND (<1.0) | 3.4 | ND (<5.0) | ND (<3.0) | ND (<1.0) | ND (<1.0) | ND (<1.0) | 22 | |
| P2170-SP-15-4B | 4B | 15.0 | 0.00 | ND (<1.0) | 1.4 | ND (<5.0) | ND (<3.0) | ND (<1.0) | ND (<1.0) | 2.5 | | |
| P2170-SP-5X-5A | 5A | 5.0 | 0.35 | | | | | | | | | |
| P2170-SP-5X-5B | 5B | 5.0 | 0.35 | | | | | | | | | |
| P2170-SP-Y-6A | 6A | 5.0 | 0.70 | | | | | | | | | |
| P2170-SP-Y-6B | 6B | 5.0 | 0.70 | | | | | | | | | | pH, alkalinity, temperature, turbidity, ozone residual and hydrogen peroxide residual will be measured by Applied with field instruments after each run.
UVT will be measured by C-nolu.
Flush at least 100 ml through sample valve and discard before collecting any treated samples for each run

Fig. 26

APPARATUS, SYSTEMS, AND METHODS FOR WATER TREATMENT

CROSS-REFERENCE TO RELATED APPLICATIONS

This application is a U.S. National Stage of International Patent Application No. PCT/US2009/001761, filed Mar. 20, 2009, which claims the benefit of U.S. Provisional Application No. 61/070,288, filed Mar. 21, 2008, and U.S. Provisional Application No. 61/072,991, filed Apr. 3, 2008, all of which are hereby incorporated by reference.

TECHNICAL FIELD

The present apparatus, systems, and methods relate to water treatment. More particularly, the present application relates to a modular water treatment apparatus for removing water contaminants that utilizes sidestream injection coupled to static mixing. The application also relates to the decontamination of contaminants and disinfection of pathogens in reclaimed or other waste water.

BACKGROUND

One way to reduce the demand for fresh water is to reclaim waste water for human and animal consumption and other uses. However, public concerns about residual contaminants, such as endocrine disrupting compounds (EDCs), pharmaceutically active compounds (PhaCs), pathogens, and other contaminants, have limited the acceptance of reclaimed water slowed the adoption of water treatment technologies. Of notable concern among organic compound contaminants are ethynyl estradiol, triclosan, DEET, surfactants, nonylphenol (NP), triclosan (TCS), and Bisphenol-A (BPA). Of particular concerns among biological contaminants are pathogens such as coliforms, poliovirus, and *Cryptosporidium*.

Concerns over residual biological and chemical contaminants has prompted the adoption of various laws, regulations, and standards concerning public water supplies, such as California Code of Regulations (CCR), Title 22. Among other criteria, Title 22 requires waste water to be treated by a chlorine disinfection process following filtration that provides a product of total chlorine residual and modal contact time measured at the same point of not less than 450 milligram minutes per liter (mg-min/L) at all times with a modal contact time of at least 90 minutes, based on peak dry weather design flow; or a disinfection process that, when combined with the filtration process, has been demonstrated to inactivate and/or remove 99.999 percent of the plaque-forming units (pfus) of F-specific bacteriophage MS2, or polio virus in the waste water. A virus that is at least as resistant to disinfection as poliovirus may be used for purposes of the demonstration. Title 22 requires also requires that the (a) median concentration of total coliform does not exceed 2.2 MPN/100 mL, (b) no more than 23 MPN/100 mL coliforms are present in any one sample in a 30-day period, and (c) that no sample shall contain a exceed 240 MPN/100 mL coliforms. Title 22 further requires at least a 5-log reduction in the levels of poliovirus, or an equivalent reduction in a suitable representative waterborne virus. Many states have similar regulations and standards.

The thorough removal of coliforms, viruses, and other biological contaminants, generally referred to as "disinfection," increases the cost of reclaiming waste water, particularly using convention water treatment methods, such as reverse osmosis (RO), ultrafiltration (UF), and advanced oxidative procedures (AOP), where the cost of setting up a 1-million gallon-per-day (1 meg gpd) treatment facility is on the order of $10 meg USD.

Ozone alone (or in combination with oxygen or air) can be used in an "ozone dissolution" process for oxidizing many waterborne contaminants. The process is relatively inexpensive, particularly when ozone is generated on site. Ozone in combination with hydrogen peroxide can be used in an "advanced oxidation" process, which produces hydroxyl radicals (see Equation 1, below), which are even more effective in removing some contaminants.

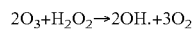

$$2O_3 + H_2O_2 \rightarrow 2OH \cdot + 3O_2 \quad \text{(Eq. 1)}$$

Water treatment technologies that use ozone ($O_3$), or ozone in combination with hydrogen peroxide ($H_2O_2$), to destroy organic compounds present in contaminated water can be effective, but the cost and complexity of the equipment necessary to perform the process preclude its widespread adoption.

The need exists for more efficient and easier to install, operate, and optimize ozone dissolution and advanced oxidation apparatus for water contaminant removal, that can be incorporated into the design of new facilities and adapted to existing treatment facilities.

SUMMARY

The following aspects and embodiments thereof described and illustrated below are meant to be exemplary and illustrative, not limiting in scope.

In one aspect, an apparatus for removing a contaminant from influent water is provided. The apparatus comprises a plurality of modules adapted for assembly into a water treatment apparatus, the plurality of modules including at least one injector module for injecting an oxidant that is premixed with a portion of the influent water in a sidestream configuration, and at least one mixer module comprising a static mixing component for mixing oxidants introduced via the injector module with influent water. The mixer module is adapted for attachment downstream of the injector module and the injector module and mixer module are further adapted to allow the assembly of any number of injector modules and any number of mixer modules into the apparatus, for removing the contaminant from influent water in a single-pass, plug flow configuration, the number of injector modules and mixer modules being selected to remove a contaminant from the influent water.

In some embodiments, the oxidant is ozone.

In some embodiments, the at least one injector module includes at least two injector modules, a first injector module being for injecting ozone that is premixed with a first portion of the influent water in a sidestream configuration, and a second injector module being for injecting hydrogen peroxide that is premixed with a second portion of the influent water in a sidestream configuration.

In some embodiments, the at least one mixer module is at least two mixer modules, a first mixer module being attached downstream of the first injector module and a second mixer module being attached downstream of the second injector module.

In some embodiments, the second injector module for injecting hydrogen peroxide is located upstream of the first injector module for injecting ozone.

In some embodiments, the static mixing component is selected from a vane-type mixing component and a tab-type mixing component.

Some embodiments include a pre-mix module upstream of the injector module and mixing module. In some embodiments, the pre-mix module is used to add hydrogen peroxide to influent water prior to contacting ozone.

Some embodiments include a contactor module downstream of the injector module and mixing module.

In some embodiments, the at least one injector module and at least one mixer module share a common housing, wherein the at least one injector module is located upstream of the at least one mixer module.

In some embodiments, the at least one injector module is a plurality of injector modules and the at least one mixer module is a plurality of mixer modules and the plurality of injector modules and mixer modules are in an alternating arrangement in the apparatus.

In some embodiments, each injector module includes at least one injector.

In some embodiments, each injector module includes a plurality of injectors arranged to maximize the dissolution of the oxidant premixed in the sidestream.

In some embodiments, the apparatus is for use in retrofitting an existing water treatment facility, and wherein the apparatus is installed in the facility and then optimized for efficiency and performance by adding or subtracting injector modules and/or mixer modules.

In some embodiments, a characteristic of effluent water, selected from the group consisting of:
  (i) the levels of a preselected residual contaminant,
  (ii) the levels of dissolved residual ozone,
  (iii) the levels of residual hydrogen peroxide, and
  (iv) water quality,
is used to measure the effect of adding or subtracting modules.

In another aspect, a sidestream apparatus for removing a contaminant from influent water is provided. The apparatus comprises a plurality of modules adapted for assembly into a main reactor in the apparatus, the plurality of modules including at least one injector module for injecting an oxidant that is premixed with a portion of the influent water in a sidestream configuration, and at least one mixer module comprising a static mixing component for mixing oxidants introduced via the injector module with influent water. The apparatus also includes a plurality of modules adapted for assembly into at least one sidestream, the plurality of modules including at least one injector module for injecting an oxidant for premixing with a portion of the influent water, and at least one mixer module comprising a static mixing component, wherein oxidant premixed with influent water in the sidestream is introduced into the main reactor to improve oxidant dissolution, and further wherein additional injector modules and/or mixer modules can be added to the sidestream and/or to the main reactor following installation to optimize the apparatus.

In some embodiments, the at least one sidestream is at least two sidestreams comprising a first sidestream for the injection and mixing of ozone and a second sidestream for the injection and mixing of hydrogen peroxide.

In another aspect, a method for removing a contaminant that imparts an unpleasant taste or odor to an influent water supply is provided. The method comprises contacting influent water with ozone in the presence of hydrogen peroxide to produce decontaminated effluent water, and providing the effluent water to a consumer, wherein the effluent water has reduced levels of the contaminant that impart an unpleasant taste and odor.

In some embodiments, the method achieves disinfection of the effluent water.

In some embodiments, the contacting with ozone in the presence of hydrogen peroxide is performed without the prior addition of a disinfectant.

In some embodiments, the effluent water does not include a disinfectant.

In some embodiments, the method further comprises the step of adding a disinfectant to the effluent water.

In some embodiments, the contaminant that imparts an unpleasant taste or odor to the influent water supply is selected from geosmin and 2-methylisoborneol (MIB).

In some embodiments, the influent water is surface water or ground water.

In some embodiments, contacting the influent water with ozone in the presence of hydrogen peroxide further removes a toxic organic contaminant.

In some embodiments, the toxic organic contaminant is selected from endocrine disrupting compounds (EDCs), pharmaceutically active compounds (PhaCs), pathogens, nonylphenol (NP), triclosan (TCS), Bisphenol-A (BPA), estradiol equivalents (EEQ), and N-nitrosodimethylamine (NDMA).

In some embodiments, the contacting is performed in an apparatus for removing a contaminant from influent water. In these embodiments, the apparatus comprises a plurality of modules adapted for assembly into a water treatment apparatus, the plurality of modules including at least one injector module for injecting an oxidant that is premixed with a portion of the influent water in a sidestream configuration, and at least one mixer module comprising a static mixing component for mixing oxidants introduced via the injector module with influent water, wherein the mixer module is adapted for attachment downstream of the injector module and the injector module and mixer module are further adapted to allow the assembly of any number of injector modules and any number of mixer modules into the apparatus for removing the contaminant from influent water in a single-pass, plug flow configuration, the number of injector modules and mixer modules being selected to remove a preselected amount of the contaminant from the influent water.

In some embodiments, the contacting is performed in an apparatus for removing the contaminant from influent water. In these embodiments, the apparatus comprises a plurality of modules adapted for assembly into a main reactor in the apparatus, the plurality of modules including at least one injector module for injecting an oxidant that is premixed with a portion of the influent water in a sidestream configuration, and at least one mixer module comprising a static mixing component for mixing oxidants introduced via the injector module with influent water, and a plurality of modules adapted for assembly into at least one sidestream, the plurality of modules including at least one injector module for injecting an oxidant for premixing with a portion of the influent water, and at least one mixer module comprising a static mixing component wherein oxidant premixed with influent water in the sidestream is introduced into the main reactor to improve oxidant dissolution, and further wherein additional injector modules and/or mixer modules can be added to the sidestream and/or to the main reactor following installation to optimize the apparatus.

In yet another aspect, an improved method for disinfecting reclaimed waste water of biological contaminants selected from coliforms and poliovirus is provided. The method comprises (a) treating the reclaimed water with an ozone dose of for a period of time sufficient to reduce the levels of coliforms and poliovirus, for example to a level as required by state law such as Title 22 of the California Code of Regulations, as of 2008 or at a future date, and (b) introducing the water treated in (a) to a public water supply.

In some embodiments, the ozone dose is 5 µg/ml or greater

In some embodiments, peroxide is added to reduce the formation of bromate.

In some embodiments, peroxide is added to improve the destruction of a trace organic compound.

In some embodiments, peroxide is added to reduce the contact time with ozone.

In some embodiments, the treatment in (a) is also sufficient to removing organic compounds selected from the group consisting of nonylphenol (NP), triclosan (TCS), and Bisphenol-A (BPA) to a desired or state or federally mandated level, such as that required by the 2008 Title 22 of the California Code of Regulations.

In some embodiments, the treatment in (a) reduces the levels of total coliform to a desired or state or federally mandated level, such as the level required by Title 22 of the California Code of Regulations.

In some embodiments, the treatment in (a) reduces the levels of fecal coliform to below detectable levels.

In some embodiments, the treatment in (a) reduces the levels of poliovirus to a desired or state or federally mandated level, such as the level required by Title 22 of the California Code of Regulations.

In some embodiments, the levels of polivirus are calculated based on the levels of MS2 coliphage.

In particular embodiments, the levels of polivirus are calculated based on a correlation between the reduction in levels of MS2 coliphage and the reduction in levels of poliovirus under equivalent conditions.

In particular embodiments, a 5-log reduction in the levels of poliovirus corresponds to a 6.5-log reduction in MS2 coliphage.

Additional embodiments of the present method, compositions, and the like will be apparent from the following description, drawings, examples, and claims. As can be appreciated from the foregoing and following description, each and every feature described herein, and each and every combination of two or more of such features, is included within the scope of the present disclosure provided that the features included in such a combination are not mutually inconsistent. In addition, any feature or combination of features may be specifically excluded from any embodiment of the present methods and compositions. Additional aspects and advantages are set forth in the following description and claims, particularly when considered in conjunction with the accompanying examples and drawings.

BRIEF DESCRIPTION OF THE DRAWINGS

FIG. 25 is a table showing the experimental and equipment settings used in conjunction with the apparatus of FIG. 24.

FIG. 26 is a table showing the test results of waste water treated with ozone, with and without hydrogen peroxide, using the apparatus of FIG. 24.

DETAILED DESCRIPTION

The present application describes apparatuses, systems, and methods relating to water treatment using ozone, and optionally hydrogen peroxide. More particularly, the present apparatus, systems, and methods relate to a modular-design, plug-flow water treatment apparatus that features sidestream injection of ozone, and optionally hydrogen peroxide, combined with aggressive static mixing to maximize the dissolution of oxidants in influent water. Introducing ozone and hydrogen peroxide via sidestream mixing ensures maximum dissolution and dispersion of the agents in the main reactor, results in high mass transfer efficiency, allowing the use of lower doses of oxidants without the need for prolonged residence time in the main reactor or recycling influent water through the main reactor. The apparatus is ideal for low dose, high flow rate, single-pass water treatment applications, such as the treatment of water for use as potable water (including drinking water), for use in irrigation, industrial applications, toilet flushing, and the like, or for discharge to the environment (e.g., lakes, streams, or other bodies of water).

I. MODULAR-DESIGN, PLUG-FLOW WATER TREATMENT APPARATUS

Figure 1:
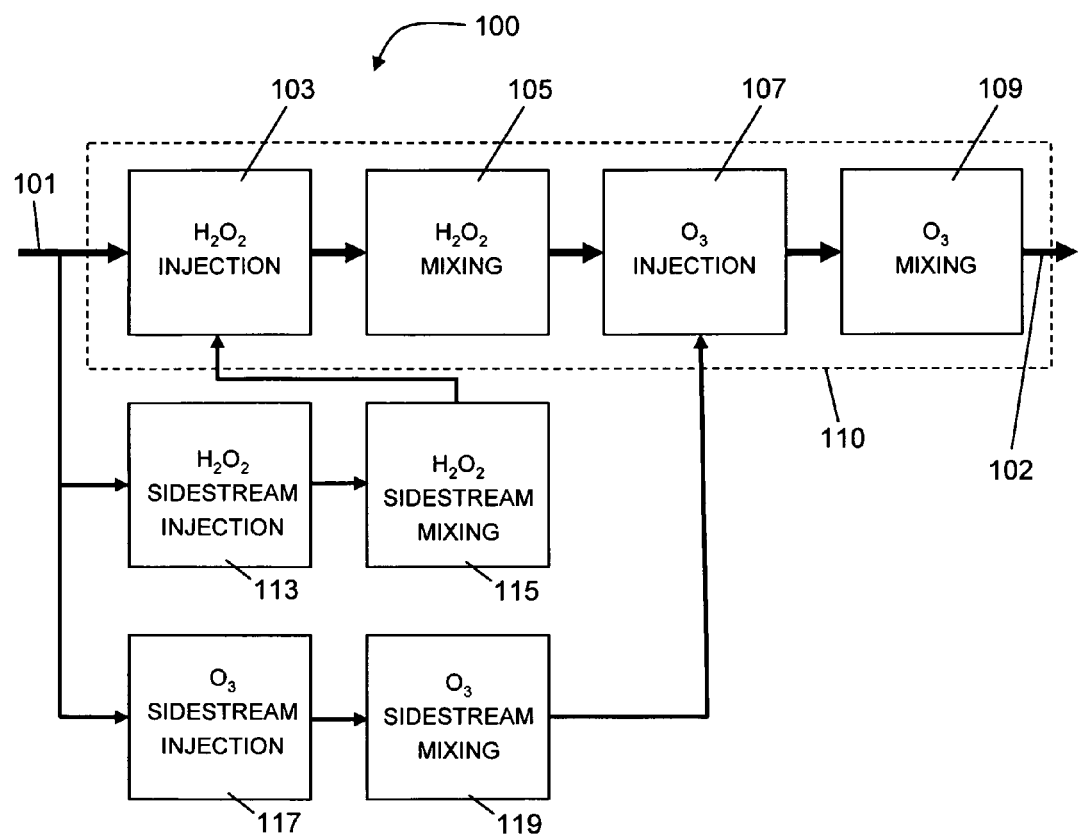
FIG. 1 is a schematic illustration of one embodiment of a modular sidestream apparatus.

A schematic diagram of an exemplary apparatus 100 is shown in FIG. 1. Water to be treated enters an influent port 101 of a main reactor 110 and treated water exits an effluent port 102. A portion of the influent water is directed away from main reactor 110 for use in an ozone sidestream reactor, which in this embodiment includes an ozone injector 117 upstream of a static mixer 119. Ozone injected at injection point 107 into the main reactor 110 via the sidestream reactor may contact a further static mixer 109 to improve ozone dissolution in influent water in the main reactor 110. The ozone may be introduced under positive pressure with respect to the water in the sidestream or educted into the side stream, e.g., by venturi effect.

In some configurations, a second portion of the influent water is directed away from main reactor 110 for use in a hydrogen peroxide sidestream reactor, which includes a hydrogen peroxide injector 113 upstream of a static mixer 115. Whereas hydrogen peroxide is conventionally added directly to the main reactor, or to influent water in a non-pressurized premixing chamber, a feature of the present apparatus is sidestream injection of hydrogen peroxide using an injector 113 coupled to a static mixer 115 to thoroughly mix hydrogen peroxide in the sidestream to improve hydrogen peroxide dissolution in the main reactor 110. More efficient hydrogen peroxide dissolution in the main reactor maximizes the production of hydroxyl radicals upon contact with ozone. This unique approach permits removal of contaminants, including biological pathogens, from the water in a single pass through the plug flow reaction system with a residence time in the main reactor of less than about 5 minutes, and in some embodiments of less than 1 minute.

Figure 2A:
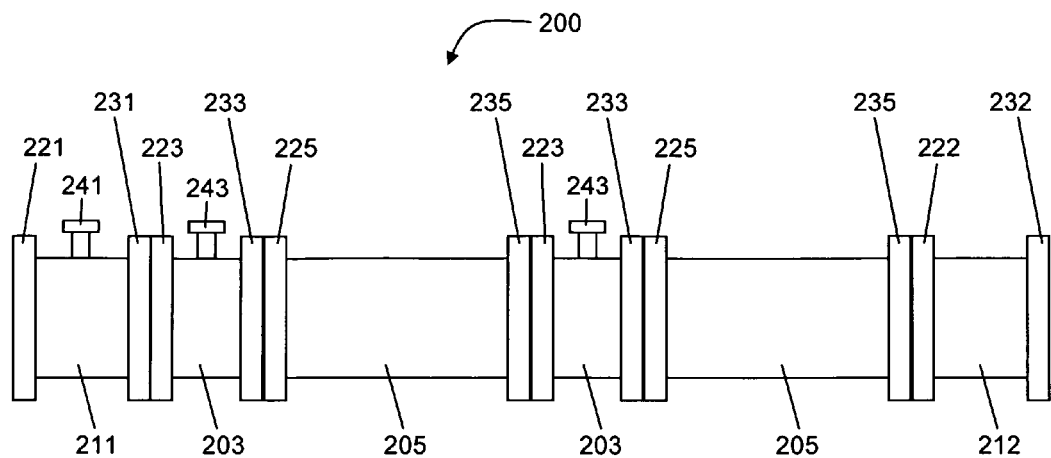
FIG. 2A-2B are side views of an exemplary main reactor or sidestream.
Figure 2B:
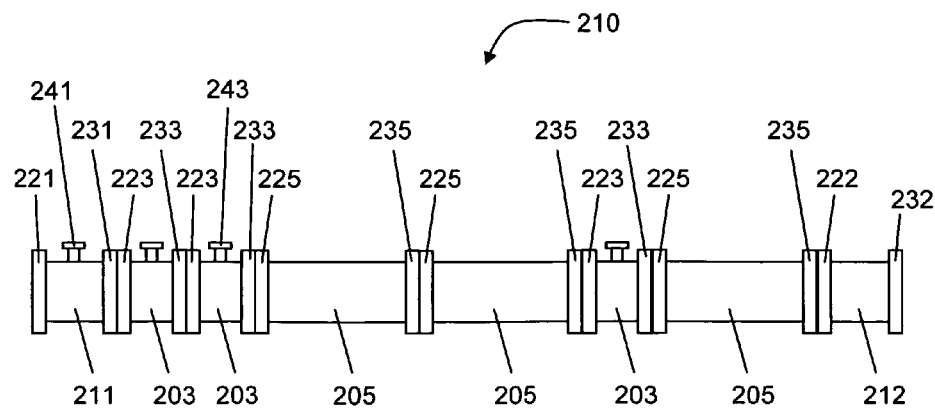

As illustrated in FIGS. 2A-2B, injector modules 203 and mixer modules 205 in a main reactor 200 (FIG. 2A) or sidestream reactor 210 (FIG. 2B) are modular, allowing them to be combined in a variety of flow configurations and arrangements to optimize and customize the apparatus for a particular application. The modules for the sidestream 210 are typically of smaller diameter than those for the main reactor 200 but otherwise share modular construction features. Thus many of the following descriptions relate to both the main reactor and the one or more sidestreams, which are part of the apparatus.

The components of the apparatus are modular in form and function, allowing the components to be manufactured in quantity and assembled in different arrangements for use in custom applications. The major components of an apparatus are the injector modules and mixer modules in the main reactor and sidestream, which are similar in features although different in diameter, with the sidestream modules being substantially smaller in diameter than the main reactor modules.

Preferably, the fittings provided at first ends 223 of each injector module 203 are the same (i.e., interchangeable) and the fittings provided at second ends 233 of each injector module 203 are the same; and the fittings provided at first ends 225 of each mixer module 205 are the same and the fittings provided at second ends 235 of each mixer module 205 are the same (as above), such that arrangements of alternating injector modules and mixer modules can be assembled from the interconnecting modules of the same pipe or tubing diameter.

The first 223 and second 233 ends of each injector 203 and/or the first 225 and second 235 ends of each mixer 205 may be the same, allowing the injector modules 203 and mixer modules 205 to be operated in either direction, for ease of assembly. In other embodiments, the injector modules 203 and mixer modules 205 are designed to operate in a single flow direction, and the first 223, 233 and second 225, 235 ends may be the same or different. In yet further embodiments, the first 223, 225 and second 233, 235 ends of each injector module 203 and mixer module 205 are the same, allowing the assembly of sequential injectors 203 and/or sequential mixers 205, as in FIG. 2B.

Flange-type (i.e., flanged) module housings may be used, and may include a seal, such as an O-ring, to minimize leakage. Threaded fittings may also be used. In one example, injector modules are provided with male threads while mixing modules are provided with female threads to allow assembly injector modules with mixer modules. In another example, injector modules are provided with female threads while mixing modules are provided with male threads. In yet other examples, each first end of the injector modules and mixer modules are provided with a male (or female) thread and each second end of the injector modules and mixer modules are provided with a female (or male) thread, such that any number of injector modules and mixer modules can be assembled into an apparatus. Alternatively, all threads on modules can be male or female and couplers or unions can be used to connect the modules. Other tubing or pipe fittings may be used.

An optional pre-mix module 211 may be added to introduce oxidants or other water treatment agents to the influent water prior to contact with the reactor (FIGS. 2A and 2B). Instead or in addition to the pre-mix module, an optional post-mix contactor module 212 (or "contactor") may be added to increase the residency time of the water in the presence of the oxidants. The contactor will typically have a larger internal volume than the injection and mixer modules, and is not shown to scale. Where present, the pre-mix module and contactor may include first 221, 222 and second 231, 232 ends, respectively. The first end 221 of the pre-mix module 211 and second end 232 of the contactor module 212, make be in the form of end caps that include fittings for attaching to influent and effluent water hookups, respectively.

Figure 2C:
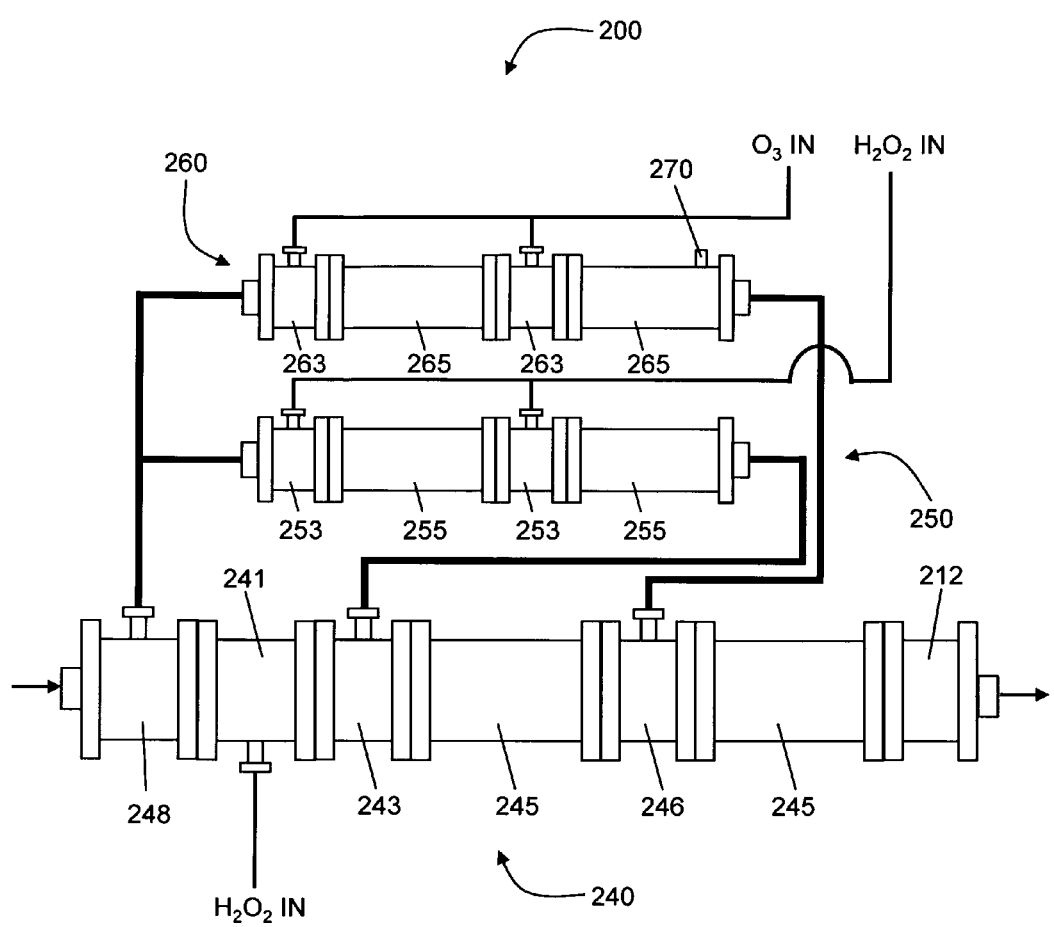
FIG. 2C illustrates an exemplary apparatus including a main reactor and two sidestreams.

An embodiment of a complete apparatus 200 for operation in an advanced oxidation mode is shown in FIG. 2C. The apparatus 200 includes a main reactor 240, an ozone sidestream 260 and a hydrogen peroxide sidestream 250. The main reactor 240 includes a diverter module 248 for diverting a portion of the influent water to the sidestreams 250, 260. The diverter module 248 or accompanying hookups may include one or more valves for modulating the amount of influent water diverted to each of the sidestreams (not shown), an optional pre-mix module 241 for injecting hydrogen peroxide, a hydrogen peroxide injector module 246 for injecting sidestream hydrogen peroxide, an ozone injector module 243 for injecting sidestream ozone, and mixer modules 245. The diverter module may be a component of the apparatus or a peripheral component.

Where hydrogen peroxide is introduced to a pre-mix module 241, it may be introduced by direct injection (i.e., without the use of a sidestream, as illustrated) or via an additional sidestream to maximize mixing and dissolution (not shown). The ozone sidestream 260 includes ozone injector modules 263 and mixer modules 265. The hydrogen peroxide sidestream 250 includes hydrogen peroxide injector modules 253 and mixer modules 255.

All or part of the influent water that flows through the hydrogen peroxide sidestream may be used in the ozone sidestream, in which case the apparatus, system, and method may involve the consecutive (i.e., sequential) addition of hydrogen peroxide, and then ozone, in a sidestream configuration, prior to introduction of the oxidants to a main reactor. Introduction of concentrated hydrogen peroxide, or hydrogen peroxide mixed in a sidestream, to the ozone sidestream, prior to introduction to the main reactor, is effective in controlling bromate formation.

In some cases, the water used in the ozone and/or hydrogen peroxide sidestream is from the same source as the water into which the sidestream water and oxidants are mixed. In this manner, water destined for a sidestream is diverted from the water flowing to the main reactor. Alternatively, the sidestream water originates from a different source than the water that enters the main reactor. In such cases, the sidestream water may include higher or lower levels of contaminants compared to the water supplied to the main reactor.

One or more degassing ports to release residual gas pressure resulting from the presence of undissolved ozone, oxygen, or air (depending on the particular oxidant gasses used). Degassing (or "off-gassing") ports may be provided in the main reactor, preferably downstream of the site of injection one or more gases, to allow the release of gas pressure produced by undissolved oxidant gases. Alternatively or additionally, degassing ports may be provided in a sidestream (typically the gas oxidant sidestream) to allow the release of gas pressure prior to mixing in the main reactor. Degassing ports may be provided in an additional module that can be assembled in combination with injector and mixer modules (i.e, a discrete "degassing module") or combined with an existing module, such as a mixer module. FIG. 2C illustrates a degassing port 270 located in mixer module 265, although other locations of one or more degassing ports are contemplated.

Figures 3A, 3B, 3C, 3D, 3E, 3F:
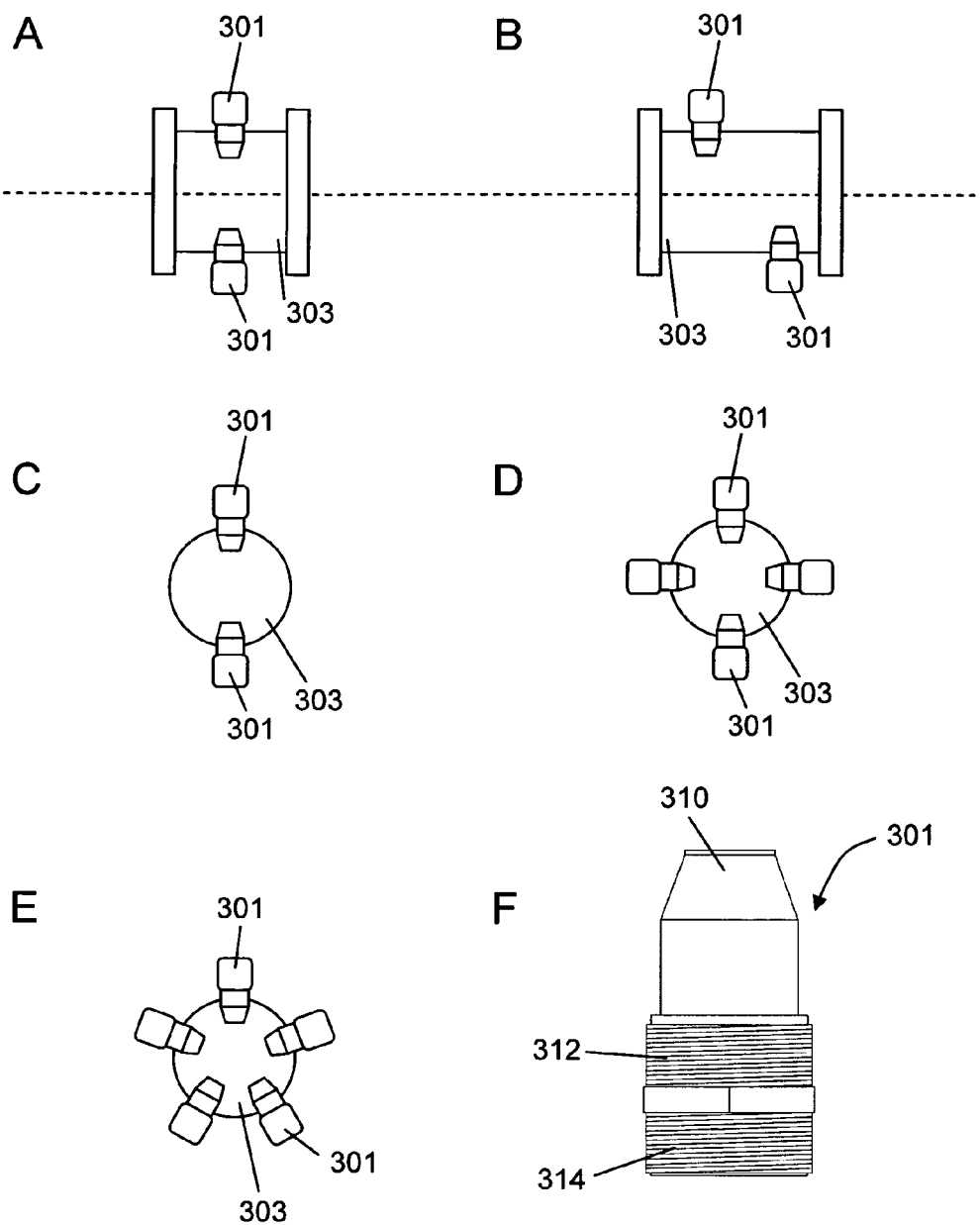
FIGS. 3A-3E are side views (FIGS. 3A-3B) and cross-sectional views (FIGS. 3C-3E) of injector modules having different injector configurations.
FIG. 3F is a side view of an exemplary injector.

FIGS. 3A-3F illustrate several different arrangements of the injectors 301 within an injection module 303. One or more injectors 301 may be present in each injection module 303. Where a plurality of injectors are present, the injectors 301 may be arranged in the same plane (FIG. 3A) or through several planes (FIG. 3B) perpendicular to the major axis (dotted line) of an injector module 303. A plurality of injectors 301 may be arranged in opposed pairs (FIGS. 3C and 3D) or radially (i.e., in a star-burst pattern; FIG. 3E) in the injector module 303, so as to maximize the distribution of the injected oxidant in the reactor. To simplify the drawings, only the inside wall of the injector module 303 (and not the flange) is shown in FIGS. 3C-3E.

An exemplary injector is illustrated in FIG. 3F. The injector is of a conventional nozzle-design, and includes a nozzle portion 310, threads for engaging a tapped hole on an injector module 312, and threads for connecting to an ozone or hydrogen peroxide supply 314 (which may be from a sidestream). The size and number of injectors 301 are selected for the application and the nozzles may be designed to produce a fan or cone-shaped spray, further distributing the injected oxidant.

Figure 4A:
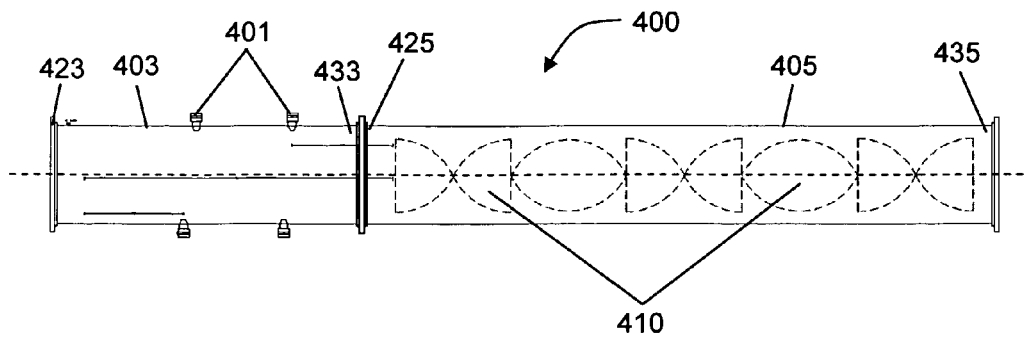
FIGS. 4A-4D are side views (FIGS. 4A and 4C) and a cross-sectional view (FIG. 4D) of mixer modules having different mixer configurations.
Figure 4B:
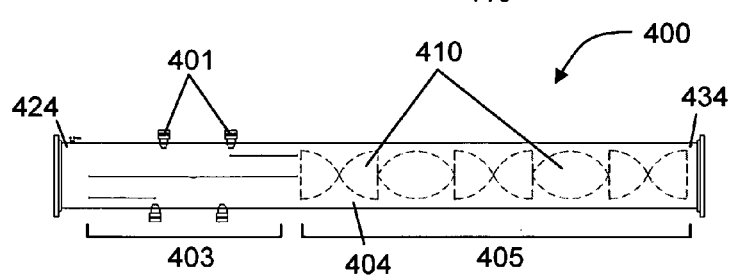

FIGS. 4A-4D illustrate exemplary apparatus including different static mixer 405 configurations. FIG. 4A shows a side view of an apparatus 400 having a separate injector module 403 and mixer module 405. The first 423 and second 433 ends of the injector module 403 and first 425 and second 435 ends of the mixer module 405 are indicated. The exemplary injector module 403 includes four injectors 401, each in a separate plane normal to the axis (dashed line) of the injector 403.

The apparatus 400 shown in FIG. 4A includes a mixer module 405 includes a vane-type static mixer 410 comprising a substantially flat twisted member that induces a vortex in water passing through the mixer 405. Such mixers are exemplified by the Chemineer model WVM mixer (Chemineer, Derby, U.K.). The apparatus 400 shown in FIG. 4B include the feature that the mixer module 404 shares a common chamber with the injector module, thereby forming a combined injector-mixer module 404 that includes an injector module 403 portion and a mixer module 405 portion. Such combined modules may be used in many embodiments of the apparatus, particularly where it is desirable to provide a "core" apparatus, having a basic level of capacity and performance, which can be modified as needed using additional modules to achieve a preselected level of capacity or performance. Additional or "add-on" injector modules and mixer modules may also be in the form of combined injector-mixer modules.

Figure 4C:
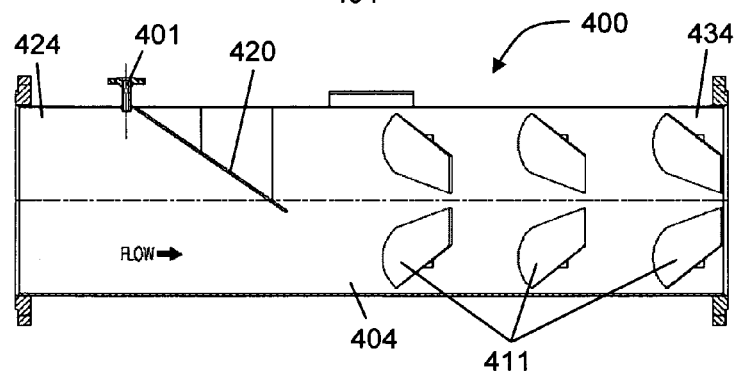
Figure 4D:
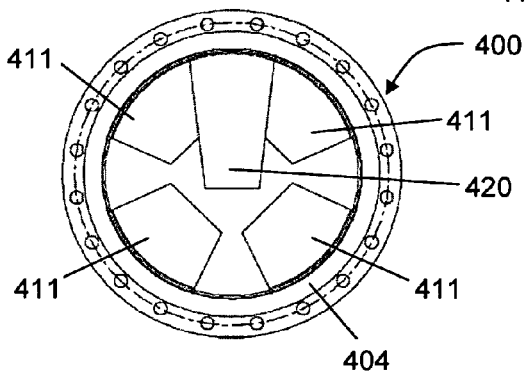

A mixer module 405 or a combined injector-mixer module 404 may alternatively include a tab-type mixer, in which one or more tabs 411 extending from the interior wall of the mixing module 404 causes turbulence or vortex motion in water passing through the mixing module (FIG. 4C). An additional pre-distribution tab or deflector 420 may be located downstream of the injector 401 to direct the injected oxidant to the center of the static mixer. The cross-sectional view (FIG. 4D) of the apparatus illustrates the mixing tabs 411 and the additional tab or deflector 420 downstream of the injector 401. Tab mixers are exemplified by the Chemineer model KMS mixer (Chemineer, Derby, U.K.).

The distance between any one or more injectors 401 and the mixer module 405 (or the components of the mixer module 405) is generally not critical but may be selected to maximize the mixing of oxidants with influent water upon introduction into the sidestream. A plurality of injector modules, for injecting the same or different oxidants directly or via sidestream, can be arranged in series upstream of a mixer module. Multiple mixer modules, of the same or different design, can be arranged in series to improve mixing. A goal of the present apparatus, systems, and methods is to maximize mixing efficiency while minimizing energy consumption; therefore, it is generally preferred to use the minimum number of efficient mixers required to achieve thorough mixing and oxidant utilization, which may be reflected by the gas to liquid ration, described, herein.

Figure 5:
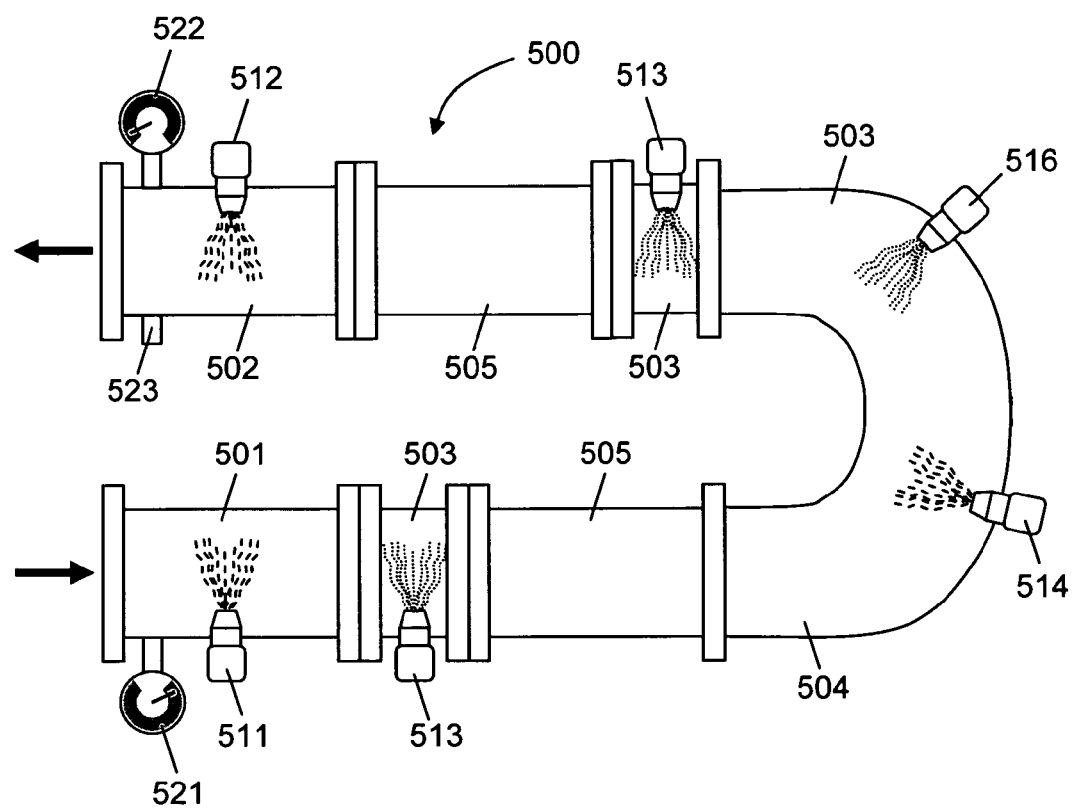
FIG. 5 is a side view of an exemplary modular main reactor apparatus for receiving ozone and hydrogen peroxide via a sidestream.

FIG. 5 illustrates an exemplary main reactor 500 comprising a pre-mix module 501, two injector modules 503, two mixer modules 505, and a post-mix module 502. The injector modules 503 include ozone injectors 513 for injecting ozone provided via a sidestream. The pre-mix module 501 and post-mix module 502 include hydrogen peroxide injectors 511, 512 for injecting hydrogen peroxide provided via a sidestream. The sidestream ozone and/or hydrogen peroxide modules may also be connected by elbows, thereby making the overall apparatus more compact. In this case, an elbow 504 is use to connect a mixer module 505 to an injector module 503. The elbow 504 may further include a sidestream or direct hydrogen peroxide injector 514 and/or a sidestream or direct ozone injector 516.

The apparatus in FIG. 5 also includes an optional influent water pressure gauge 521, effluent water pressure gauge 522, and effluent water sample port 523, which can be used to monitor the performance of the apparatus and inform adjustments and modifications.

II. OPERATING CONFIGURATIONS

The modular nature of the present apparatus allows the assembly of specialized, on-site treatment units, with a minimum of components of minimum complexity. Modules are readily added or subtracted to the apparatus to optimize efficiency and performance. In this manner, an apparatus may be installed in a water treatment facility, setup with an initial number of modules, tested for efficiency and performance, and modified with additional injector modules and mixer modules (or combined modules) until satisfactory effluent water quantity and quality are obtained. This avoids the high cost and risk of designing a specialized apparatus for each application, in some cases with limited scalability and ability to substitute components.

The apparatus can be operated in an ozone dissolution mode, in which ozone is injected into the reactor via a sidestream without the addition of hydrogen peroxide, or in advanced oxidation mode, in which ozone is injected into the reactor via a sidestream and hydrogen peroxide is injected either directly into the main reactor or via a sidestream into the main reactor Preferred apparatus for operation in an ozone dissolution mode include a main reactor and at least one sidestream for injecting and mixing ozone prior to its introduction to the main reactor. The sidestream includes an injector module and a mixer module, which may be discrete components or combined in a common housing. The main reactor may include any number of ozone injectors and mixers in addition to those located in the sidestream. In some embodiments, a mixer module is provided in the main reactor immediately downstream of the sidestream ozone injection port, such that sidestream-injected ozone is maximally distributed in the main reactor. The mixer module may be of a vane-type, a tab-type, other mixer types known in the art, or a combination thereof. Where a plurality of mixers is used, it may include one or more of each type.

Apparatus for operation in an advanced oxidation mode further include at least one hydrogen peroxide injector for injecting and mixing hydrogen peroxide in the main reactor. Hydrogen peroxide may be introduced directly or via a sidestream to maximize mass transfer efficiency and reduce the amount of hydrogen peroxide required to reduce the levels of contamination in influent water by a preselected amount. As above, the sidestream includes an injector module and a mixer module, which may be discrete components or combined in a common housing. The main reactor may include any number of hydrogen peroxide injectors and mixers in addition to those located in the sidestream. In one example, a mixer module is provided in the main reactor immediately downstream of the sidestream hydrogen peroxide injection port, such that sidestream-injected hydrogen peroxide is maximally distributed in the main reactor.

A plurality of injector modules may be positioned in series, followed by one or more mixer modules. A single injector module may include injectors for ozone, hydrogen peroxide, or both. For example, where a plurality of injectors are located in the same injector module, some (i.e., a first portion) of the injector may be for injecting ozone, while other (i.e., a second portion) are for injecting hydrogen peroxide. Alternatively, "ozone only" injector modules and "hydrogen peroxide-only" injector modules may be used, each having injectors only for the indicated oxidant. Ozone injector modules and hydrogen peroxide injection modules may be arranged in an alternating manner or in another logical manner to deliver the oxidants for maximum efficiency and performance.

While ozone and hydrogen peroxide can be injected in any order, it may be preferable to first inject hydrogen peroxide upstream of ozone, giving the hydrogen peroxide time to thoroughly mix with water prior to exposure to ozone. Addition of hydrogen peroxide at an early stage reduces the formation of bromate, which occurs in the present of elevated ozone concentrations but is reduced in the presence of hydrogen peroxide (see, e.g., U.S. Pat. Nos. 5,851,407 and 6,024, 882). Where maximum hydroxyl radical formation and reduced consumption of hydrogen peroxide are desired, ozone may be injected first to react with organic compounds present in the influent water to produce hydroxyl radicals or other radicals, followed by the addition hydrogen peroxide to react with residual ozone to produce additional hydroxyl radicals.

Another way to control bromate formation is to introduce concentrated hydrogen peroxide, or a portion of the diluted hydrogen peroxide from a hydrogen peroxide sidestream, into the ozone sidestream, thereby controlling bromate formation in the ozone sidestream. Other chemicals can be injected into the ozone sidestream to control bromate formation, for example, chlorine, ammonia, or acid.

Mixer modules may be of a vane-type or a tab-type, or both. Where a plurality of mixer modules are used, they may include one or more of each type, thereby exploiting the advantages of each type of mixer. A mixer module may be positioned after each ozone and/or hydrogen peroxide injector module. Alternatively, a mixer module may be positioned after each ozone injector module-hydrogen peroxide injector module pair. A mixer module may also be positioned after a plurality of ozone injector modules and/or hydrogen peroxide injector modules.

A pre-mix module may be included upstream of the main reactor, and may include ozone and/or hydrogen peroxide injectors. Pre-mix modules may include inlet ports (which may be injectors) for adding hydrogen peroxide to influent water prior to ozone injection. Ozone only operation may also benefit from the use of a contactor located downstream of the main reactor for allowing the ozone sufficient time to dissipate in the water and affect decontamination. Such downstream ozone contactors may take the form of a pipeline, baffled or unbaffled tank (including an "over" or "under" baffled tank), or similar devices. Downstream ozone contactors may be integrated into the main reactor or maybe a stand-alone component downstream of the main reactor. Contactor modules may include inlet ports (which may be injectors) for adding hydrogen peroxide to effluent water following ozone injection, e.g., to control bromate formation. Where the apparatus is operated in an ozone dilution mode, without hydrogen peroxide, the pre-mix and/or contactor modules may be used to deliver additional ozone.

A downstream gas-liquid separator may be included to release excess ozone gas, oxygen, and or air, e.g., to reduce corrosion in downstream equipment and to reduce fugitive emissions to promote health and safety. Excess gas may be disengaged (vented) using either a pipe or a vessel of larger diameter than the reactor, such that the velocity of the water is reduced, increased surface area is exposed, and excess gas is allowed to vent through a vent valve and, optionally, an ozone destruct unit. In some cases, the larger diameter pipe or vessel may be baffled or the liquid stream containing excess gas is introduced into the larger pipe or vessel on a tangent to induce a vortex to assist in evolving excess gas.

The initial main reactor and sidestream flow rates can be preselected for a particular application and the optimized following installation and initial testing. Guidelines for the initial set up of an apparatus are provided in Tables 1 and 2, below; however these are only examples.

the overall efficiency and increase the environmental impact of the process. Combining sidestream injection of oxidants with efficient static mixers provides efficient mixing at lower flow rates and energy costs. Exemplary sidestream flow rates are from about 2 to about 20 feet per second (FPS), from about 3 to about 15 FPS, or even from about 5 to about 10 FPS, although flow rates outside these ranges may provide satisfactory results with suitable equipment.

The present modular, compact apparatus can be optimized or customized by adding additional modules. For example, the apparatus may be coupled with upstream or downstream ultraviolet light processing operations, biofiltration processing operations (including but not limited to the use of membrane biofilm reactor (MBfR) processing), granulated activated charcoal (GAC) or powdered activated charcoal (PAC) processing operations, reverse osmosis (RO) processing operations, and/or chemical treatment processing operations (including but not limited to the addition of chlorine, hypochlorite, chloramine, thiosulfate, and the like.

TABLE 1

Ozone and oxygen flow parameters.

| | Flow rate (MGD) | | | | | | | | |
|---|---|---|---|---|---|---|---|---|---|
| | 1.0 | 1.0 | 1.0 | 2.5 | 2.5 | 2.5 | 5.0 | 5.0 | 5.0 |
| $O_3$ dose (mg/L) | 1.0 | 5.0 | 15.0 | 1.0 | 5.0 | 15.0 | 1.0 | 5.0 | 15.0 |
| $O_2$ flow (slpm) | 0.7 | 3.4 | 10.1 | 45.1 | 225.4 | 676.3 | 90.2 | 450.9 | 1352.6 |
| SS flow rate (%) | 7.5 | 15 | 25 | 7.5 | 15 | 25 | 7.5 | 15 | 25 |
| SS flow rate (GPM) | 52.1 | 104.2 | 173.6 | 130.2 | 260.4 | 434.0 | 260.4 | 520.8 | 868.1 |
| G/L ratio (total) | 0.007 | 0.036 | 0.108 | 0.007 | 0.036 | 0.108 | 0.007 | 0.036 | 0.108 |

SS = sidestream;
GPM = gallons per day;
MGD = million gallons per day

TABLE 2

Hydrogen peroxide flow parameters.

| | Flow rate (MGD) | | | | | |
|---|---|---|---|---|---|---|
| | 1.0 | 1.0 | 2.5 | 2.5 | 5.0 | 5.0 |
| $H_2O_2$ dose (mg/L) | 0.5 | 7.5 | 0.5 | 7.5 | 0.5 | 7.5 |
| $H_2O_2$ flow rate (ml/min) | 3.3 | 49.7 | 8.3 | 124.3 | 16.6 | 248.6 |
| Sidestream flow rate (%) | 2.5 | 5.0 | 2.5 | 5.0 | 2.5 | 5.0 |
| Sidestream flow rate (GPM) | 17.4 | 35.0 | 43.4 | 86.8 | 86.8 | 173.6 |
| 0.75" (feet/sec) | 9.1 | — | — | — | — | — |
| 1" (feet/sec) | 5.9 | 11.7 | 14.7 | — | — | — |
| 1.5" (feet/sec) | 2.5 | 5.0 | 6.3 | 12.5 | 12.5 | — |
| 2" (feet/sec) | — | — | — | — | 7.6 | 15.2 |
| 2.5" (feet/sec) | — | — | — | — | 5.1 | 10.2 |

SS = sidestream;
GPM = gallons per day;
MGD = million gallons per day

A consideration in designing the ozone sidestream is the gas/liquid (G/L) ratio, which reflects the amount of ozone gas dissolved in the influent water. A high gas/liquid ratio suggests that ozone gas is not efficiently dissolved in the influent water to affect oxidation of contaminants. A low gas/liquid ratio suggests that ozone gas is efficiently dissolved in the influent water where it is available to oxidize contaminants in the water. A high gas/liquid ratio can be reduced by providing additional mixing or increasing velocity through the ozone sidestream.

Generally, the higher the sidestream velocity, the better the mixing of injected oxidants in the sidestream water, and ultimately the main reactor. However, higher sidestream velocities are associated with increased energy costs, which reduce While the present apparatus, systems, and methods are capable or removing contaminants from influent water, they may also be used for the pre-treatment or "modification" of influent water in preparation of one or more of the above-described processing operations. In such cases, pretreatment may include, for example, modifying organic carbon compounds to make them more amenable to removal by downstream processing operations, inactivating bacteria, viruses, or other pathogens without actually removing them from influent water (i.e., "disinfection"), increasing the UV transmittance of the water to improve the efficacy of downstream UV-mediated contaminant removal (i.e., "clarification"), and the like. Unless otherwise specified, the expression "removal of contaminants from influent water" includes such modification, disinfection, and clarification.

The advantages of the present apparatus, systems, and methods may be embodied in a kit of parts, or "kit" to be supplied to a municipality, company, or individual for adding ozone dissolution and/or advanced oxidation capabilities to water treatment or other facilities. Such kits may include one or more main reactor injector modules and mixer modules, one or more sidestream injector modules and mixer modules, a plurality of injectors, connectors and fittings, and instructions for installing and using the apparatus. Kits may be sized for particular application as determined by throughput capacity, influent water contaminant levels and types, effluent water contaminant requirements, existing equipment and fittings, and other considerations.

Kits may include several injector modules with the same or different injector configurations. The injector modules may be adapted to accept a plurality of injectors, such as by including threaded openings for injectors or threaded plugs to seal unused openings. The kits may also include several mixer modules with the same or different injector configurations. Where desired, additional injector modules and mixer modules can be combined with the components of the kit.

Kits may be packaged for treating a preselected volume of water or level of contamination, and may be accompanied by written or electronic instructions, spreadsheets, and other documents or software relating to the installation, start-up, and optimization of the apparatus. Such kits can be installed and operated by a customer or installed by specially trained personnel and operated by a customer.

Such kits of parts may be used, e.g., to produce drinking water with reduced bad taste and odor, to obtain disinfection credits from a municipality, for organic carbon removal, to remove trace organics, for disinfection, to meet Title 22 requirements, for industrial water remediation, and a variety of other purposes.

III. OXIDANTS AND CONTAMINANTS

Ozone dissolution processes and particularly advanced oxidation processes are effective in removing a variety of organic compound contaminants from water, including endocrine disrupting compounds (EDCs), pharmaceutically active compounds (PhaCs), and pathogens, such as *Cryptosporidium*, poliovirus, and coliforms. As used herein, "contaminants" intends organic compounds as well as biological pathogens. Advanced oxidation is particularly effective in removing organic compounds such as nonylphenol (NP), triclosan (TCS), Bisphenol-A (BPA), estradiol equivalents (EEQ), and N-nitrosodimethylamine (NDMA). Other contaminants that ozone dissolution and advanced oxidation processes are effective in removing include but are not limited to geosmin, 2-methylisoborneol (MIB), mercaptans, 2,3,6-trichloroanisole, iron and manganese, sulfides, chlorine, MTBE. Some of these contaminants are discussed in further detail, herein, in the context of using present apparatus, systems, and methods to improve the taste and odor of water.

Variations of the ozone dissolution process utilize ozone, oxygen, air (which includes oxygen), ozone and oxygen, ozone and air, oxygen and air, or ozone, oxygen and air, as gas oxidants. Such combinations of ozone, oxygen, and/or air can be used in an advanced oxidation process/mode along with hydrogen peroxide. While the present apparatus, systems, and methods are mainly described with respect to the use of ozone (with or without hydrogen peroxide), ozone, oxygen, and/or air can be used in place of ozone in some embodiments. The selection of the particular gas oxidant(s) largely depends on the types and levels of contaminants present in the influent water, the additional decontamination process operations that are used in combination with the present apparatus, systems, and methods, and the proposed use of the decontaminated water.

When operating the apparatus, systems, and methods in an advanced oxidation mode, an excess of hydrogen peroxide may be used where bromate formation is an issue. In particular, bromate formation can be reduced using a plurality of hydrogen peroxide sidestream injectors to maintain a high level of hydrogen peroxide in the main reactor. Bromate formation can also be controlled via pH adjustment and/or the addition or chlorine or ammonia. Any of the present apparatus, systems, and methods can be adapted to permit the introduction of such bromate formation-controlling agents. Conversely, an excess of ozone, or both ozone and hydrogen peroxide, may be used to ensure that discharged (treated) water includes residual oxidants to promote further decontamination, even downstream of the present apparatus.

IV. RESIDENCE TIMES

A feature of the present apparatus, system, and method is the ability to greatly reduce the residence time of contaminated water in a reactor that is required for the substantial removal of a particular contaminant. Residence time refers to amount of time a given volume of contaminated water must spend in a reactor apparatus to achieve a preselected amount of reduction of a contaminant. Unless otherwise specified, residence time includes time spent in a downstream contactor, if such a component is present. However, where specified, residence time includes only time spent in the main reactor. Residence time in the main reactor can be modulated by controlling the flow rate/velocity of influent water through the main reactor.

Conventional ozone and ozone/peroxide water treatments require several minutes of residence time (e.g., 8 or more minutes) to provide an adequate reduction of contaminants. In contrast, the efficiency of the present apparatus, system, and methods permits adequate contaminant removal in minimal residency time, typically only a few minutes, if not seconds. Exemplary residency times are about 10 seconds to about five minutes, for example, 10, 15, 20, 25, 30, 40, or 50 seconds, or 1, 1.5, 2, 2.5, 3, 3.5, 4, 4.5, or 5 minutes. This reduction in residence time increases the throughput of contaminated water, allowed a greater volume of water to be treated and reused.

V. PROCESS TO CONTROL TASTE AND ODOR OF WATER

An exemplary application for the present compositions, systems, and methods is the removal of contaminants that affect taste and odor. As it relates to drinking water, taste and odor is an aesthetic issue, as well as a health issue, since even natural waters that are relatively unpolluted by human activity can contain compounds that make it unpalatable. It will be appreciated, however, that removal of contaminants that affect taste and odor can is not limited to the systems and modular apparatus described herein.

While many contaminants can impart an unpleasant taste and/or odor to drinking water, a small number of compounds are ubiquitous in ground and/or surface waters and known to impart a characteristic "earthiness" to water. Some of these compounds are listed in Table 3, below. Geosmin is produced by cyanobacteria and its odor is apparent when rich soil is turned. Geosmin is also found in some foods, such as beets. 2-methylisoborneol (MIB) is produced by cyanobacteria and mold-like, filamentous bacteria, actinomycetes, and is common in surface waters. The levels of geosmin in surface water often increase during the summer months, whereas the levels of MIB are persistent year round.

Sulfides and mercaptans produce a "rotten-egg" taste and odor and occur in some surface and ground waters. Moderate levels of iron and manganese (and other metals) produce an unpleasant metallic taste and odor. MTBE (methyl tertiary butyl ether) is compound widely added to gasoline to raise its octane rating. In addition to reducing detonation, MTBE spreads quickly through surface and ground water supplies, and has become a significant cause of unpleasant taste and odor in water obtained from gasoline-contaminated regions. 2,3,6-trichloroanisole is a compound produced by some fungi from chlorophenol compounds, and it primarily responsible for the unpleasant taste and odor of contaminated or "corked" wine. It imparts a similar taste and odor to some natural waters.

At the present time, there are no health-related guidelines or regulations anywhere in the world concerning such compounds as geosmin or MIB, a fact that does not make the problem any less apparent. The average person detects the musty odors of geosmin and MIB at concentrations of 4 and 9 nanograms per liter (ng/L), respectively. Bad tasting drinking water is unpleasant to ingest, discourages people from drinking enough water, encourages people to purchase bottled water and other commercial beverages, and can be sentinel for more toxic contaminants.

TABLE 3

Common contaminants that produce unpleasant taste and odor

| Contaminant | Source | Type of Water | Odor threshold (ng/L) |
|---|---|---|---|
| Geosmin | Cyanobacteria | SW | 4 |
| 2-methyliso-borneol (MIB) | Cyanobacteria, Actinomycetes | SW | 9 |
| Mercaptans | Microcystis, Cyanobacteria | SW | N/A |
| 2,3,6-tri-chloroanisole | Bacterial metabolite | Wine | 7 |
| Iron and manganese | Thermal stratification, $O_2$ depletion, anaerobic bacteria | GW and SW | 40,000 |
| Sulfides | Thermal stratification, $O_2$ depletion, anaerobic bacteria | GW and SW | 100 |
| Chlorine | Disinfection | GW and SW | 200,000 |
| MTBE | LUSTs | GW and SW | 20,000 |

GW = ground water; SW = surface water; LUST = leaking underground storage tank

Ozone dissolution, and particularly advanced oxidation provides an efficient and cost-effective method for removing water-borne contaminants that cause unpleasant taste and odor.

VI. EXAMPLES

To facilitate a better understanding of the present systems and methods, the following examples of certain aspects of some embodiments are given. In no way should the following examples be read to limit, or define, the scope of the systems and methods.

Example 1

A comparison of processing according to the present compositions, systems, and methods with conventional methods for removing taste and odor is shown in Table 4.

TABLE 4

Comparison of different treatment methods for removing geosmin and MIB

| Treatment | Feed Rate (mg/L) | Removal (%) Geosmin | Removal (%) MIB |
|---|---|---|---|
| Powdered activated carbon | 10 | 40 | 62 |
| Powdered activated carbon | 25 | 52 | 65 |
| Potassium permanganate | 0.8 | 42 | 28 |
| Chlorine | 2 | 45 | 33 |
| Hydrogen peroxide | 1 | 50 | 72 |
| Ozone | 2.5 | 94 | 77 |
| Ozone and hydrogen peroxide | 2.5 | 97 | 95 |

The data shows that chlorine is least effective at removing both geosmin and MIB from water, despite its widespread use in water treatment. Moreover, it is well-known that chlorine imparts its own characteristic taste and odor to water, which is generally considered unsavory. Powdered activated charcoal (PAC) can be more effective than chlorine at removing MIB and is about as effective as chlorine at removing geosmin. Potassium permanganate is about as effective as chlorine at removing geosmin and less effective at removing MIB.

Hydrogen peroxide is more effective than chlorine at removing MIB and about as effecting as chlorine at removing geosmin. Ozone treatment (i.e., ozone only, without hydrogen peroxide) is very effective in removing geosmin and about as effective as hydrogen peroxide in removing MIB. The most effective treatment for reducing both geosmin and MIB is ozone in combination with hydrogen peroxide, i.e., advanced oxidation treatment, which reduced the levels of both contaminants by at least 95%.

Figure 6:
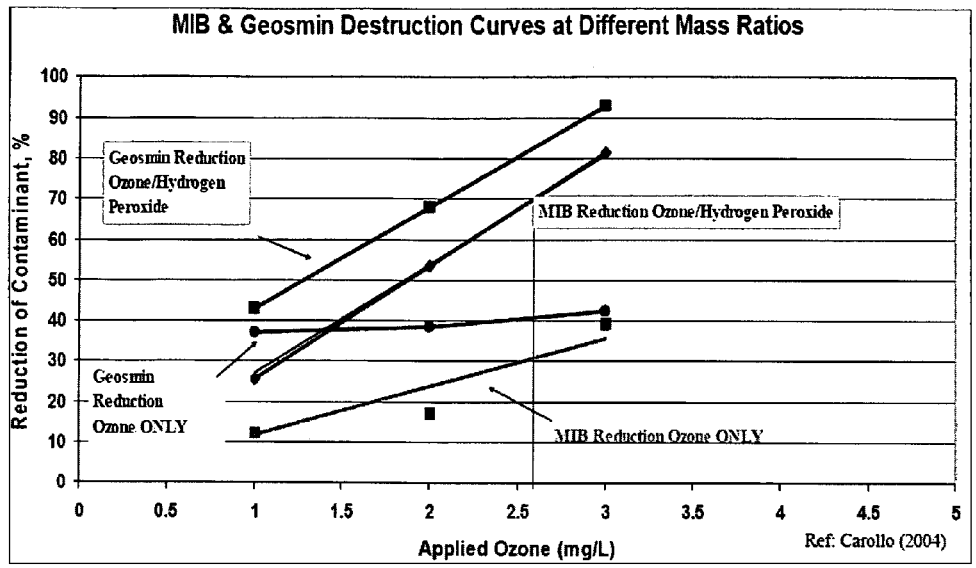
FIG. 6 is a graph showing a decrease in geosmin and MIB as a function of ozone concentration, using conventional ozone treatment or treatment via high-pressure oxidation.

A more detailed comparison of ozone only treatment and advanced oxidation treatment with respect to geosmin and MIB removal is shown in FIG. 6. Increasing levels of ozone only (up to 3 mg/L) produced about a 40% reduction in the levels of both contaminants. In contrast, the same ozone dosage in combination with hydrogen peroxide produced a greater than 80% reduction in MIB and a greater than 90% reduction in geosmin. Even half-the-dose of (i.e., 1.5 mg/L) ozone, in combination with hydrogen peroxide, produced about a 55% reduction in geosmin and about a 40% reduction in MIB, which was better than ozone only at 3 mg/L. These results demonstrated that advanced oxidation treatment can reduce the levels of geosmin and MIB more effectively and using less ozone that conventional ozone treatment.

Example 2

Figure 7:
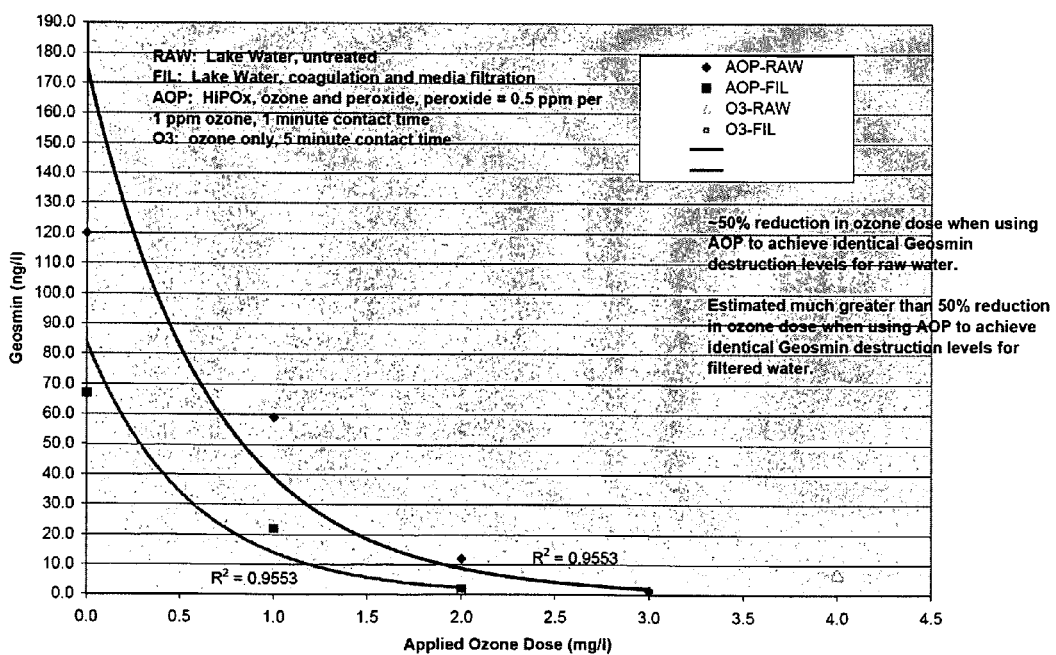
FIG. 7 is a graph showing a decrease in geosmin as a function of ozone concentration, using conventional ozone dissolution treatment or advanced oxidation.

A comparison of ozone dissolution treatment and advanced oxidation treatment to destroy geosmin was conducted. Lake water (untreated or "RAW", and coagulated and media filtrated or "FIL") was exposed to various amounts of ozone. In the ozone dissolution treatment ("O3"), the lake water was exposed to ozone only for five minutes. In the advanced oxidation treatment ("AOP"), the lake water was exposed to hydrogen peroxide and ozone for one minute. The hydrogen peroxide was present in an amount of about 0.5 parts per million ("ppm") per 1 ppm ozone. The results from this experiment are shown in FIG. 7. A 50% reduction in ozone dose was seen when using AOP to achieve identical geosmin destruction levels for raw water. An estimated greater than 50% reduction in ozone dose was seen when using AOP to achieve identical geosmin destruction levels for filtered water.

Figure 8:
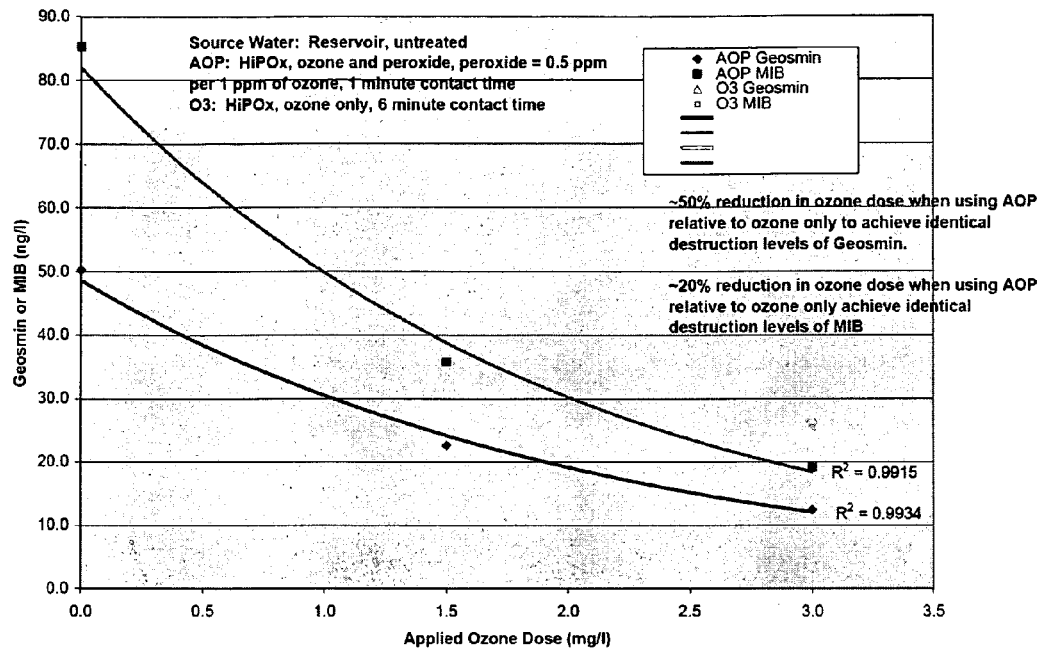
FIG. 8 is a graph showing a decrease in geosmin and MIB as a function of ozone concentration, using conventional ozone dissolution treatment or advanced oxidation.
Figure 9:
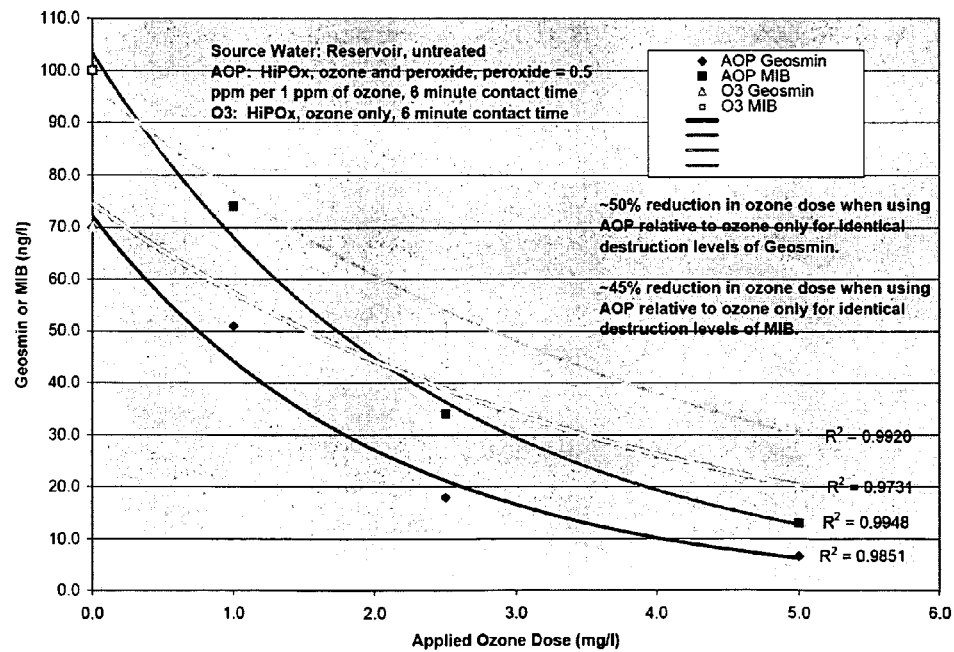
FIG. 9 is a graph showing a decrease in geosmin and MIB as a function of ozone concentration, using conventional ozone dissolution treatment or advanced oxidation.

Similar experiments were conducted for comparing ozone dissolution treatment and advanced oxidation treatment to destroy geosmin and MIB. Untreated reservoir water was treated using AOP and O3. In the AOP, the reservoir water was exposed to 0.5 ppm of hydrogen peroxide per 1 ppm of ozone for one minute (FIG. 8) or six minutes (FIG. 9). In the O3, the reservoir water was exposed to ozone only for six minutes. The results from these experiments are shown in FIGS. 8-9. In both studies, a 50% reduction in ozone dose was seen when using AOP relative to ozone only to achieve identical geosmin destruction levels. A 20% reduction in ozone dose was seen when using AOP for one minute relative to ozone only to achieve identical MIB destruction levels (FIG. 8). A 45% reduction in ozone dose was seen when using AOP for six minutes relative to ozone only to achieve identical MIB destruction levels (FIG. 9).

Example 3

Conditions were identified for achieving a level of disinfection sufficient to meet the standards of California Code of Regulations, Title 22. The results were obtained using versions of the ozone dissolution treatment or advanced oxidation treatment methods under pressure. Two series of tests were performed on pilot-scale reactors (10 gallons per minute (gpm) or 18.6 gpm) and the remaining tests performed on bench-top reactors about 3 gpm). The pilot-scale reactors were tested at the Dublin San Ramon Services District (DSRSD) and supplied with water from various waste water utilities across California, which was processed by either sand filtration or microfiltration prior to processing using ozone or ozone/peroxide.

Detailed testing of the response of various pathogens and indicator organisms to different treatment conditions was performed to determine the effect of ozone dose, contact time, temperature, pH, alkalinity, and solids, and ozone injection methods (i.e., direct gas or sidestream), on waste water ozone disinfection (Table 5).

TABLE 5

Conditions tested in present study

| Test ID | Test Date | Test Organism(s) | Filtration Type | Transferred Ozone Dose (mg/L) | Peroxide Dose (peroxide to ozone mass ratio) | Contact Times (seconds) |
|---|---|---|---|---|---|---|
| B-1 | Dec. 10, 2007 | MS2 | MF | 1.9 | 0 | 0, 18, 50, 93 |
| B-2 | Nov. 13, 2007 | MS2 | MF | 2.9 | 0 | 0, 18, 50, 93 |
| B-3 | Nov. 13, 2007 | MS2 | MF | 4.6 | 0 | 0, 18, 50, 93 |
| B-4 | Nov. 13, 2007 | MS2 | MF | 4.6 | 0.6 | 0, 18, 50, 93 |
| B-5 | Dec. 10, 2007 | MS2 | MF | 4.6 | 0 | 0, 18, 50, 93 |
| B-6 | Nov. 5, 2007 | MS2 | MF | 4.9 | 0 | 0, 18, 50, 93 |
| B-7 | Oct. 22, 2007 | MS2 Total Coliform | Media | 2.6 | 0 | 0, 18, 50, 93 |
| B-8 | Nov. 15, 2007 | MS2 Total Coliform | Media | 2.9 | 0 | 0, 18, 50, 93 |
| B-9 | Dec. 10, 2007 | Total Coliform | Media | 4.5 | 0 | 0, 18, 50, 93 |
| B-10 | Nov. 15, 2007 | MS2 Total Coliform | Media | 4.6 | 0.3 | 0, 18, 50, 93 |
| B-11 | Nov. 15, 2007 | MS2 Total Coliform | Media | 4.7 | 0 | 0, 18, 50, 93 |
| B-12 | Dec. 10, 2007 | Total Coliform | Media | 8 | 0 | 0, 18, 50, 93, 157 |
| B-13 | Nov. 15, 2007 | MS2 Total Coliform | Media | 8.6 | 0 | 0, 18, 50, 93, 157 |
| B-14 | Dec. 10, 2007 | Total Coliform | Media | 11.4 | 0 | 0, 18, 50, 93, 157 |
| B-15 | Nov. 15, 2007 | Total Coliform | Media | 12.1 | 0 | 0, 18, 50, 93, 157 |

Coliforms were generally indigenous to the waste water, while MS2 coliphage and polivirus were seeded. A list of abbreviations and units used in the study is provided in Table 6 below.

TABLE 6

Water quality parameters and associated units

| Chemical Parameter, Abbreviation | Typical Units |
|---|---|
| Alkalinity, ALK | mg/L as $CaCO_3$ |
| Ammonia, $NH_3$ | mg/L $NH_3$ |
| Biochemical Oxygen Demand, BOD | mg/L BOD |
| Bromate | μg/L $BrO_3$ |
| Bromide | μg/L Br |
| Combined and Free Chlorine | mg/L Cl |
| Hydrogen Peroxide Residual | mg/L $H_2O_2$ |
| Nitrate, NO3—N | mg/L $NO_3$ |
| Nitrite, NO2—N | mg/L $NO_2$ |
| Ozone Demand | mg/L $O_3$ |
| Ozone Residual | mg/L $O_3$ |
| Particle Size Distribution, PSD | NA |
| pH | pH units |
| Temperature, T | ° C. |
| Total Organic Carbon, TOC | mg/L C |
| Total Suspended Solids, TSS | mg/L TSS |
| Turbidity | NTU |
| Ultraviolet Transmittance, UVT | % |

MS2 Coliphage as an Indicator for Poliovirus

One aspect of the present methods is the use of the levels of MS2 coliphage as an indicator for the levels of poliovirus by correlating the disinfection levels of poliovirus and MS2 coliphage under ozone treatment conditions, thereby minimizing the handling of poliovirus while ensuring that the disinfection conditions sufficiently remove poliovirus.

Figure 10:
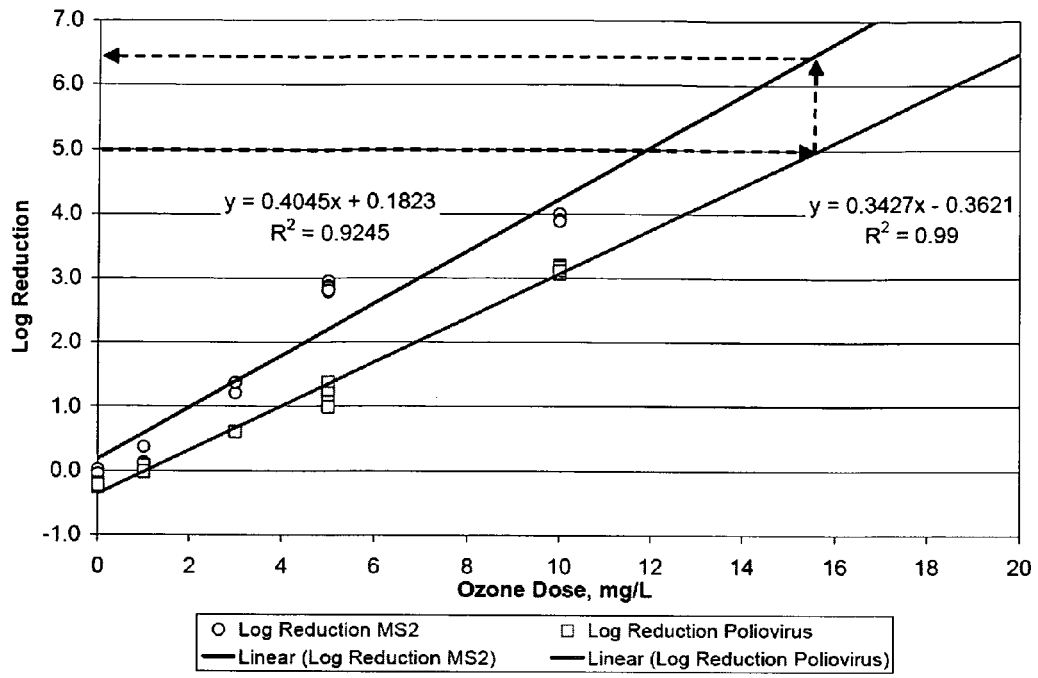
FIG. 10 is a graph showing the correlation between the reduction of poliovirus and the reduction in MS2 virus under comparable treatment conditions.

As shown in FIG. 10, a 5-log disinfection of (or reduction in) poliovirus corresponded to a 6.5-log disinfection of MS2 coliphage. The following equations were derived from these data:

$$\text{Log Reduction of Poliovirus} = 0.3427 \times \text{Ozone Dose} - 0.3621 \quad (1)$$

$$\text{Log Reduction of } MS2 = 0.4045 \times \text{Ozone Dose} + 0.1823 \quad (2)$$

This relationship was observed over all the range of tested ozone doses. Peroxide addition did not impact disinfection efficacy of virus at the ozone and peroxide doses tested.

Reduction in MS2 Coliphage and Coliforms

Figure 11:
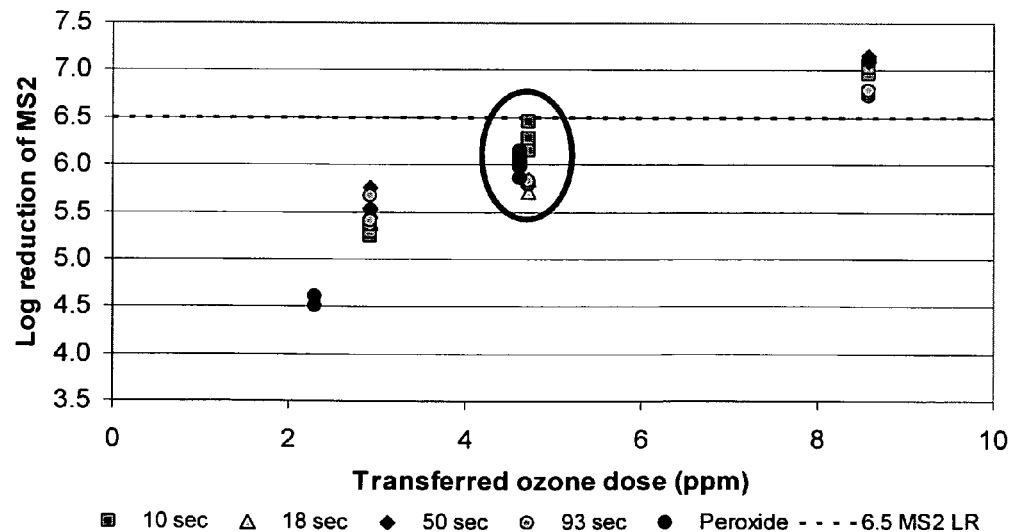
FIG. 11 is graph showing the reduction in MS2 as a function of ozone dose using media-filtered water.
Figure 13:
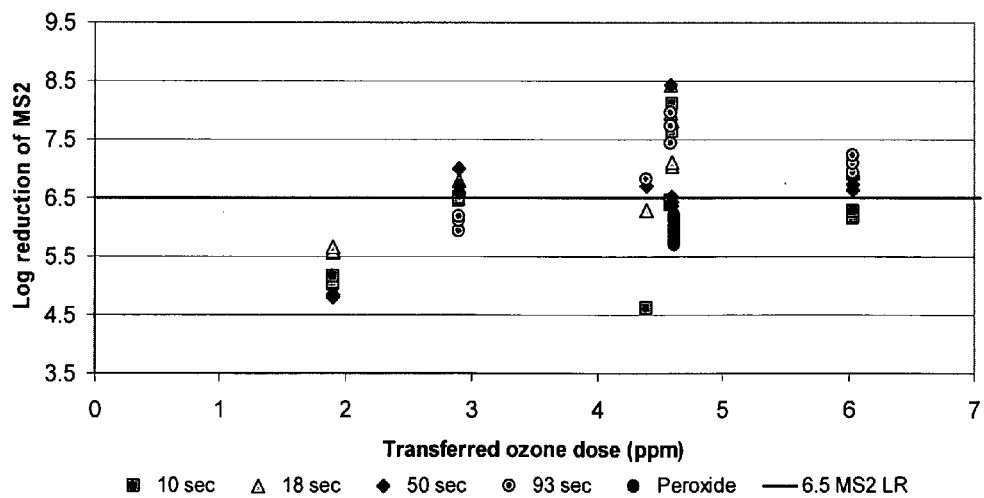
FIG. 13 is graph showing the reduction in MS2 as a function of ozone dose using microfiltered water.

Experiments were performed to determine the ozone dose and contact time (CT) required to reliably produce a 6.5-log disinfection of MS2 coliphage, corresponding to a 5-log reduction of polio virus. An ozone dose of greater than about 5 ppm was required to achieve a 6.5-log disinfection of MS2 coliphage in media-filtered waste water (FIG. 11), and the addition peroxide did not significantly affect disinfection (circled area). Similar results were obtained using microfiltered water (FIG. 13), although the ozone required to achieve a 6.5-log disinfection of MS2 coliphage was slightly lower.

Figure 12:
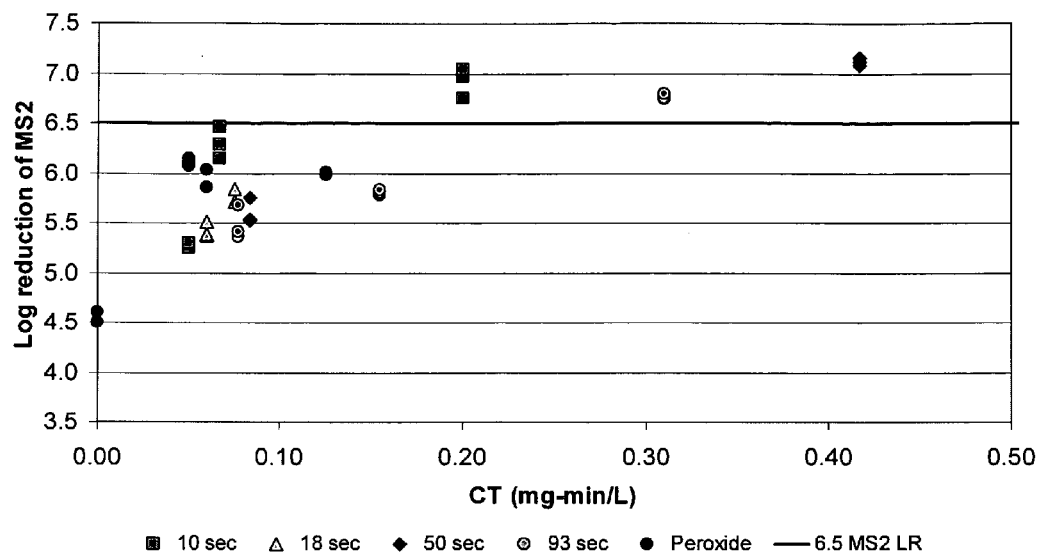
FIG. 12 is graph showing the reduction in MS2 as a function of contact time (CT) using media-filtered water.
Figure 14:
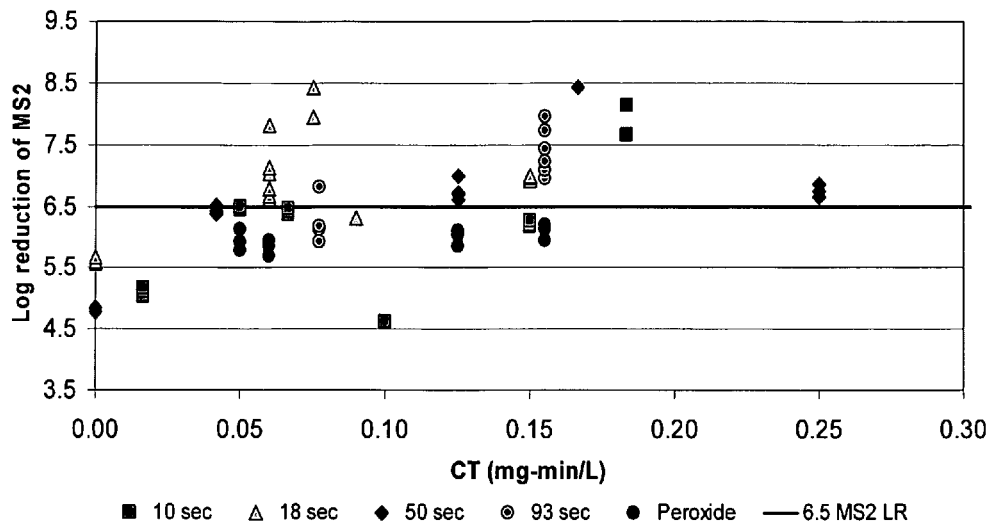
FIG. 14 is graph showing the reduction in MS2 as a function of contact time (CT) using microfiltered water.

A contact time as low as about 10 seconds was sufficient to achieve a 6.5-log disinfection of MS2 coliphage in media filtered water (FIG. 12) and microfiltered water (FIG. 14). In contrast, conventional chlorine treatment of water typically requires about a 90-second contact time (minimum CT=450 mg-min/L) to achieve similar levels of disinfection.

Figure 15:
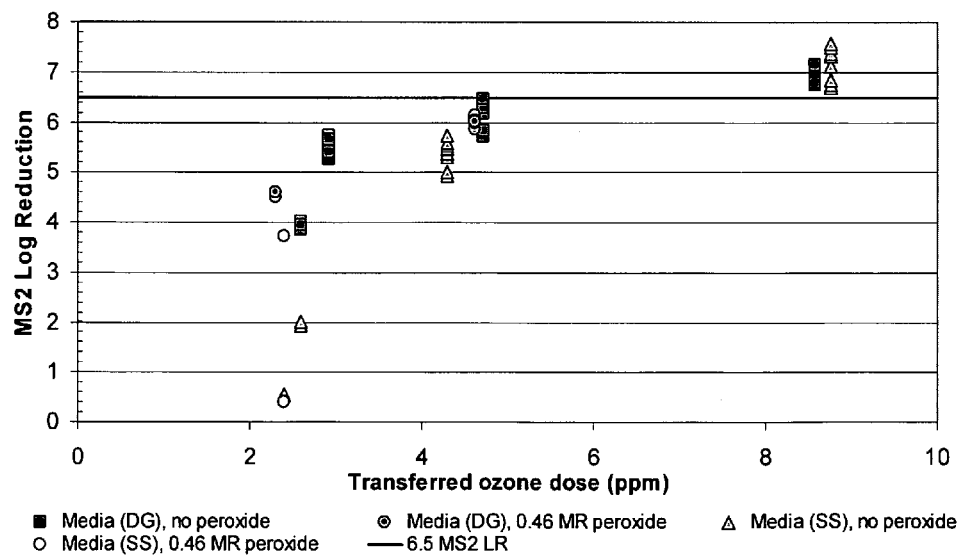
FIGS. 15-16 are graphs showing the reduction in MS2 as a function of ozone dose using different configurations for ozone injection.
Figure 16:
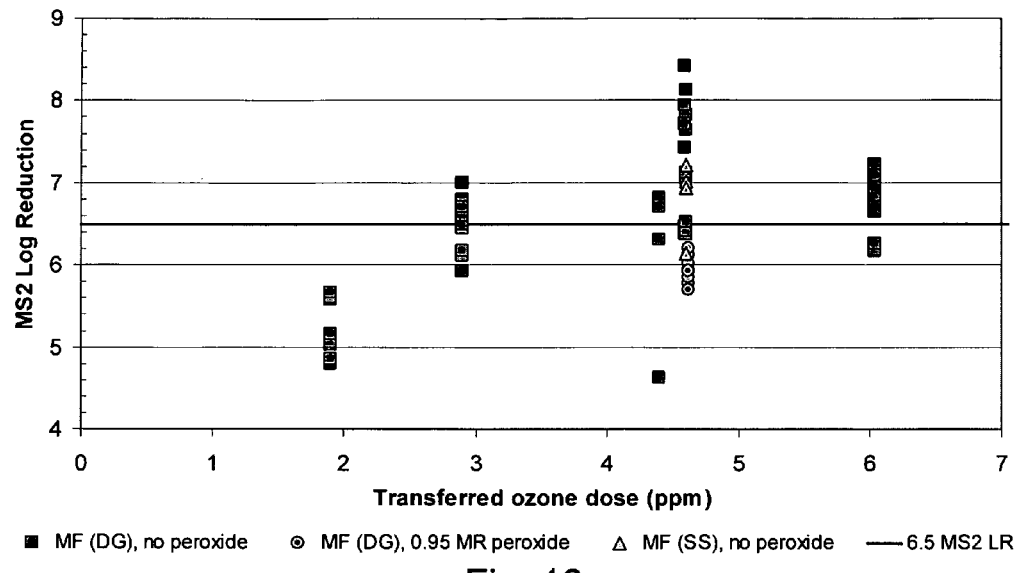

Ozone can be introduced into the test reaction either directly (i.e., direct gas or "DG") and via a sidestream (i.e., "SS"), which provides mixing of ozone and water prior to introduction to the reactor. As shown in FIG. 15 and FIG. 16, both direct gas and sidestream introduction of ozone were effective to achieve a 6.5-log disinfection of MS2 coliphage in media-filtered water. Notably, the direct gas method was somewhat more efficient at lower ozone doses, perhaps because direct injection of a low dose of ozone is capable of disinfecting water immediately in contact with the injected ozone, while diluting a low dose of ozone prior to introduction into the reactor reduces the amount of disinfection by a localized high dose of ozone. However, at higher doses of ozone, i.e., doses sufficient to achieve a 6.5-log disinfection of MS2 coliphage, direct gas and sidestream introduction were similarly efficient.

These results demonstrated that ozone or ozone/peroxide treatment was adequate to produce a 6.5-log disinfection of MS2 coliphage, corresponding to a 5-log disinfection of poliovirus, in significantly less time that required using conventional UV treatment.

Figure 17:
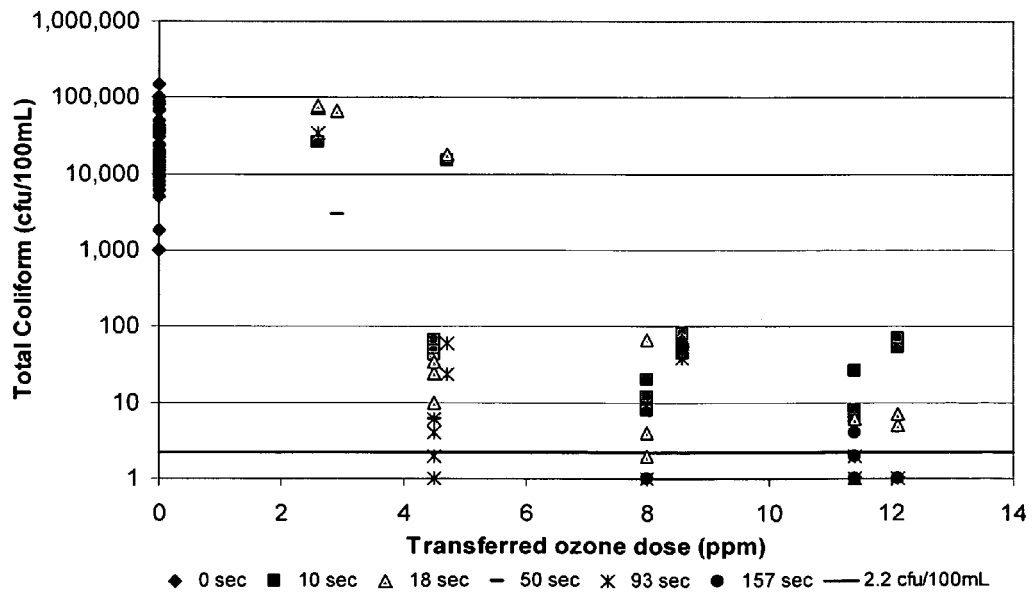
FIG. 17 is graph showing the reduction in total coliforms as a function of ozone dose.
Figure 18:
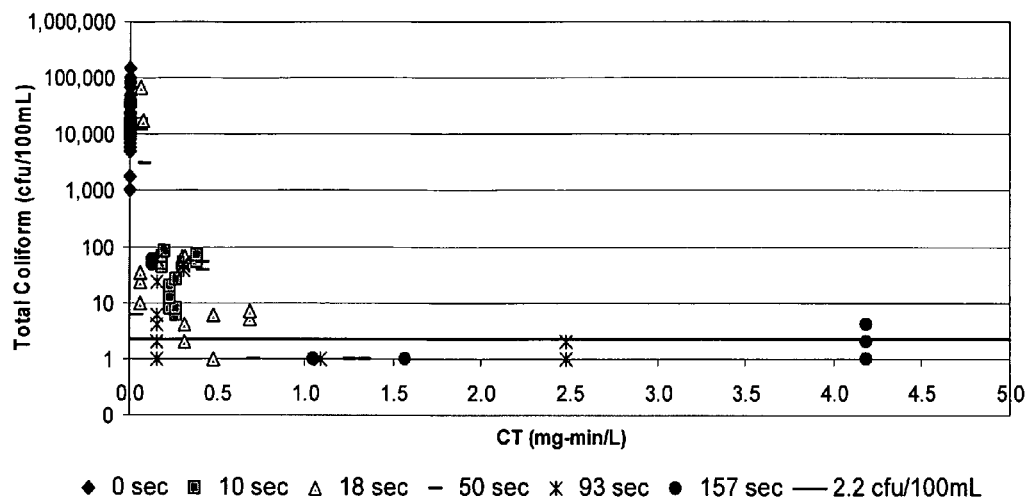
FIG. 18 is graph showing the reduction in total coliforms as a function of contact time (CT).

A requirement for water reclamation methods is adequate disinfection of coliforms as described in Title 22. Using the present using ozone or ozone/peroxide apparatus, systems, and methods, non-detectable levels of total coliform were achieved at ozone doses as low as 4.5 mg/L (FIG. 17) and contact times (CT) of 1 mg-min/L resulted in less than 2.2 MPN/100 mL total coliform (FIG. 18). Therefore, total coliform disinfection with the present ozone or ozone/peroxide methods occurred rapidly using ozone doses similar to those effective to disinfect water of MS2 coliphage and poliovirus.

Figure 19:
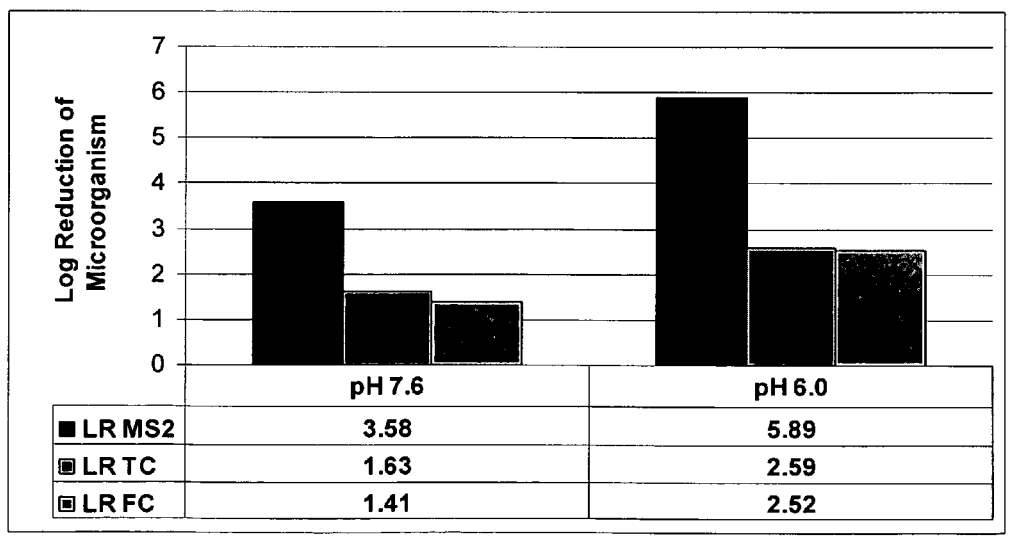
FIG. 19 is a bar graph showing the effect of influent water pH on disinfection.

To ensure that the present apparatus, systems, and method were effective in disinfecting waste water of poor quality, which often has a low pH due to the presence of various acidic dissolved solutes, disinfection was tested using influent water having an approximately neutral pH (i.e., a pH of 7.6) and an acidic pH (i.e., a pH of 6.0), using a bench-top reactor. As shown in FIG. 19, disinfection of low pH water was even more efficient than disinfection of neutral pH water with respect to MS2 coliphage, total coliforms (TC), and fecal coliforms (FC).

While the present water reclamation methods do not appear to be significantly affected by water quality, the presence of ozone scavengers (such as ammonia, nitrite, and nitrate), the pH of the water, the biological oxygen demand (BOD), the total organic carbon (TOC) content, the levels of total suspended solids (TSS), the turbidity, and the temperature of the waste water may be considered when selecting ozone doses and/or contact times.

The present ozone or ozone/hydrogen peroxide reactors are designed, in one embodiment, to be efficient in terms of ozone transfer efficiency with proposed contact times of less than 2 to 3 minutes. The results of the present experiments suggest that ozone transfer efficiency is the primary determinant for disinfection efficiency, and that contact time is of less importance.

Destruction of Trace Organic Compounds

While ozone and ozone/peroxide methods are know to reduce the levels of various organic compounds commonly found in waste water, the efficacy of the present apparatus, systems, and methods for removing nonylphenol (NP), bisphenol-A (BPA), and triclosan (TCS) from waste water was also tested.

Figure 20:
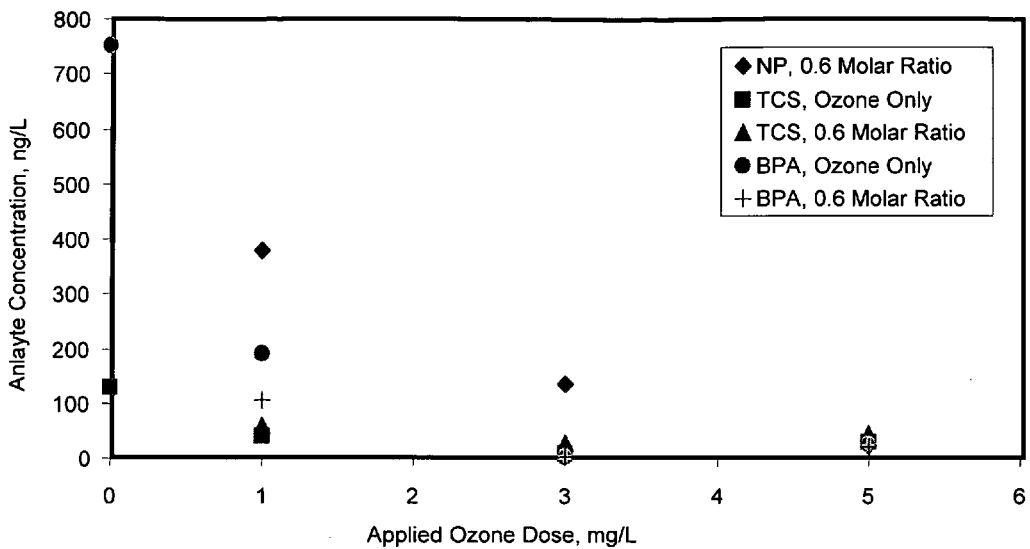
FIGS. 20-21 are graphs showing the reduction in trace organic contaminants as a function of ozone dose.
Figure 21:
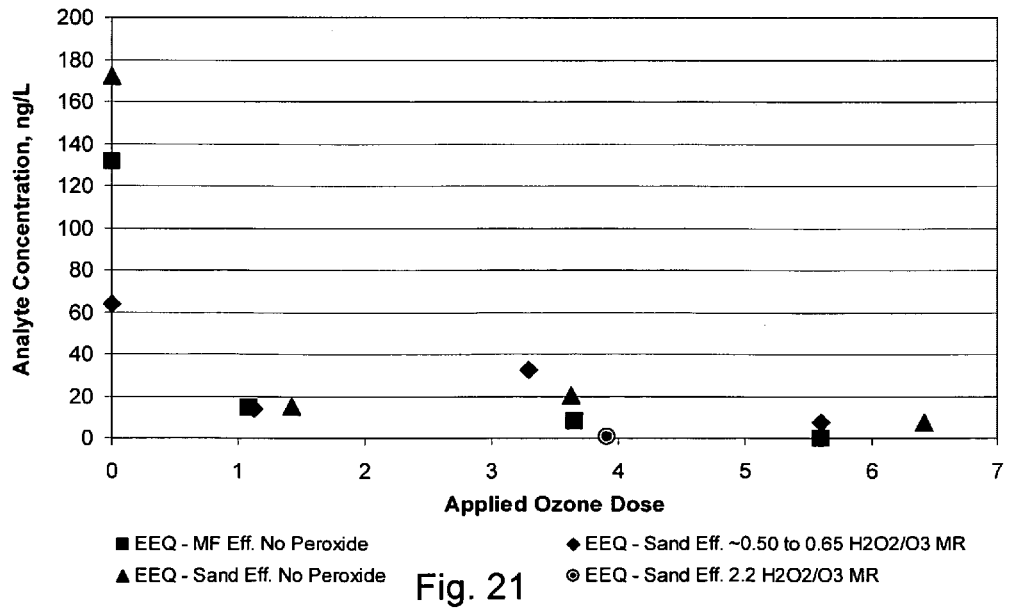

As shown in FIG. 20, an ozone dose of about 5 mg/mL, which was effective in disinfecting water of coliforms and viruses, was also effective to substantially reduce the levels of NP, TCS, and BPA. As expected, pretreatment of the waste water by media (sand) filtration or microfiltration did not affect the ozone dose required for destruction of organic compounds (FIG. 21).

These results show that the present methods are effective for both disinfection of water and for organic compound removal.

Control of Bromate Formation

Figure 22:
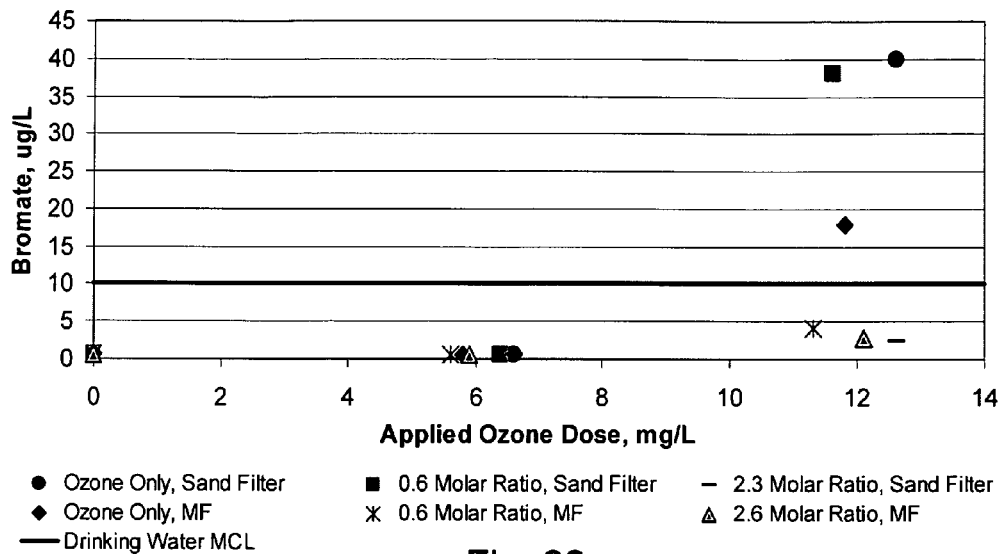
FIG. 22 is a graph showing the formation of bromate as a function of ozone dose.
Figure 23:
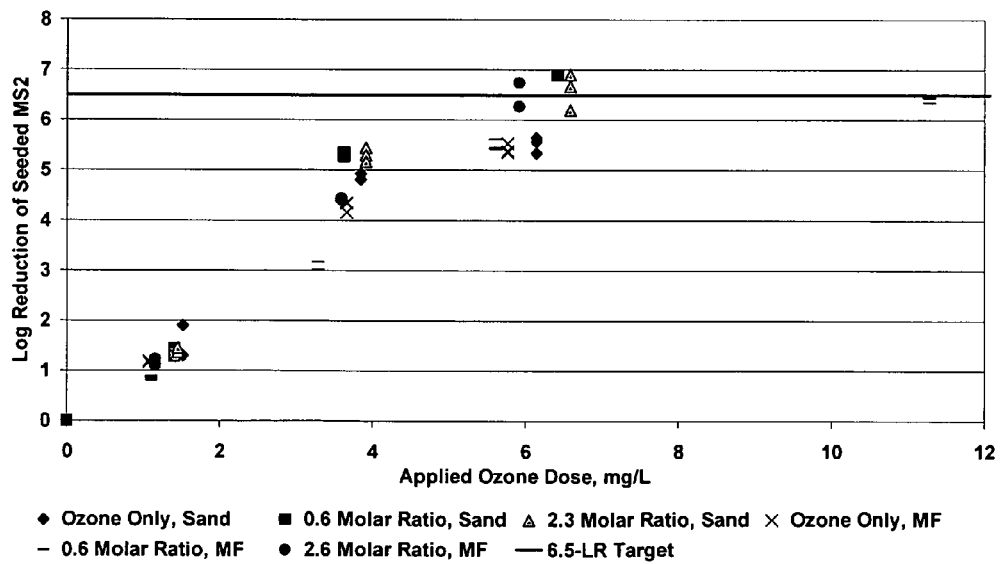
FIG. 23 is a graph showing the reduction in MS2 in micro- and media-filtered water with and without peroxide addition.

Bromate formation is known to occur in water under conditions of high ozone doses. The levels of bromate in drinking water should not exceed 10 μg/mL. As shown in FIG. 22, hydrogen peroxide addition mitigates bromate formation, even at much higher ozone doses than are necessary to achieve adequate disinfection and/or organic contaminant destruction. Moreover, the presence of hydrogen peroxide did not interfere with the ability of the methods to achieve the required 6.5-log disinfection of MS2 coliphage in media filtered or microfiltered water (FIG. 23).

Hydrogen peroxide may also be used to promote advanced oxidation for simultaneous removal of trace contaminants with little or no impact on disinfection while improving bromate control, or to decrease the contact time in the reactor required for contaminant removal.

The results of Example 3 demonstrate that non-detectable levels of coliforms and the equivalent of a 5-log disinfection of poliovirus can be achieved using ozone or ozone/peroxide water reclamation methods. Minimum contact times (CT) were short, typically less than 2 minutes, and ozone dose appeared to be most important in determining the efficacy of the method. An ozone dose of about 5 mg/mL was sufficient to adequately disinfect and decontaminate waste water to satisfy Title 22 requirements.

The use of MS2 coliphage disinfection as a proxy for poliovirus disinfection represents a new way to evaluate water treatment methods with avoiding handling and accidental exposing to poliovirus. The correlation between the levels of MS2 coliphage disinfection and the levels of poliovirus disinfection at a given ozone dose was consistent over a wide range of ozone doses.

Disinfection of low pH water was even more efficient than disinfection of neutral pH water. The destruction of trace organic contaminants was as effective as observed previously using ozone treatment, and bromate formation was controlled by the addition of hydrogen peroxide without reducing the efficacy of disinfection or decontamination. Both direct gas and sidestream injection of ozone was effective in disinfection and decontamination.

The present studies suggest that ozone and ozone/oxygen-based water treatment methods can be used to adequately disinfect and decontaminate waste water in accordance with Title 22 requirement, and at a fraction the cost of conventional methods.

Example 4

Figure 24:
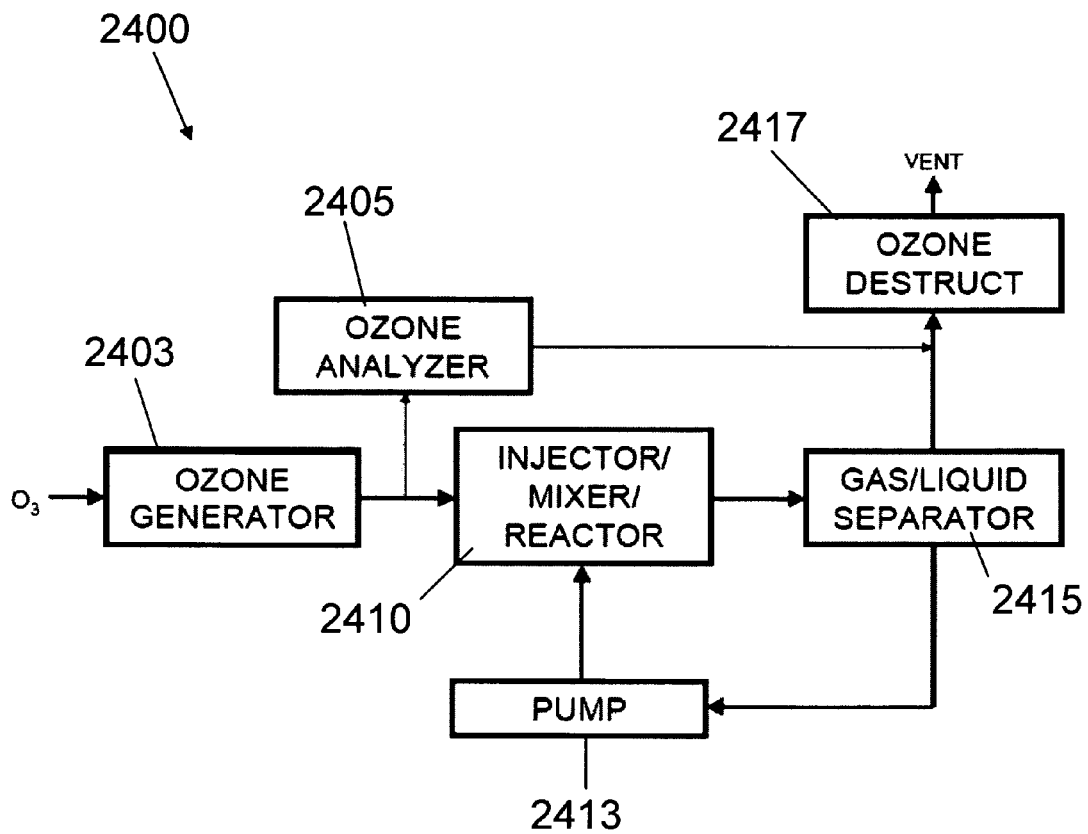
FIG. 24 is a schematic of an exemplary apparatus.

Waste water containing endocrine disrupting compounds (EDCs) was evaluated using both ozone dissolution treatment and advanced oxidation treatment for the destruction of EDCs along with disinfection to meet ND coliform levels for State of Utah Type I disinfection compliance for water reuse. The untreated filtered effluent included the following EDCs: carbamazepine (~100 ng/L), estradiol (~2 ng/L), ethynyl estradiol (~20 ng/L), esterone (~90 ng/L), and progesterone (~5 ng/L). The untreated waste water was fed into a semi-continuous bench-scale test reactor 2410 shown in the lab test unit 2400 of FIG. 24. The lab test unit 2400 includes an ozone generator 2403, an ozone analyzer 2405, a reactor 2410 having an ozone injector, static mixer, and tubular reactor, a recirculation pump 2413, a gas-liquid separator 2415, and a thermo-catalytic ozone destruct unit 2417. Reactor and piping materials of construction are Schedule-40 clear PVC. Oxygen or ozone tubing/piping is 316 L stainless steel or PFA (Teflon™). The ozone generator 2403 is an ASTeX Model 8200. The ozone analyzer 2405 is an INUSA Model H1-X. The ozone destruct unit 2417 is an INUSA part number 810-0062-01. The mixer of system 2410 is a ½", four-element, Kenics KMA static mixer insert.

Experimental and equipment settings are calculated and listed in FIG. 25. Prior to conducting the test, the ozone destruct unit 2417 is turned on and preheated for ten minutes. The flow of oxygen through the ozone generator 2403 is adjusted using an oxygen rotameter and the generator pressure is adjusted using a backpressure regulator. The ozone analyzer 2405 is zeroed using pure oxygen prior to turning on the ozone generator 2403. The lab test unit 2400 is charged with 2.2 liters of distilled water prior to the first run. The ozone generator 2403 and the reactor 2410 are then operated at maximum dosing conditions for 15-20 minutes to both clean the unit 2400 and to set/adjust equipment parameters. Following completion of the pre-test operation, the unit 2400 is drained and rinsed with an additional 2.2 liters of distilled water.

Based on prior disinfection experience of tertiary-filtered waste water effluents, the applicable ozone dose range was estimated to be 1-15 mg/L. The selected test ozone doses were 5, 10, and 15 mg/l as shown in FIG. 25 for Runs 2 thru 4 in the ozone only mode. In the AOP mode, the ozone dose was 5 mg/l with hydrogen peroxide to ozone mole ratios of 0.35 and 0.70 as shown in FIG. 25 for Runs 5 thru 6.

For each run, a graduated cylinder was filled to 2.2 liters with untreated sample. The entire contents of the graduated cylinder were charged to the reactor. If testing in AOP mode, hydrogen peroxide was added to the entire contents prior to charging the reactor.

For each run, the pump was started, and air is purged from the reactor as the water was re-circulated and mixed for a brief period. The water rotameter was set to 3.5 gallons/minute. With the ozone generator venting to the ozone destruct unit, the generator power dial was set to achieve the ozone concentration described prior to conducting the test. When the ozone concentration had stabilized, as measured by the ozone analyzer, the generator output was directed to the reactor. After the appropriate amount of ozone (dose) had been added to the reactor, the generator output was re-directed to the ozone destruct and samples were collected for dissolved ozone residual and/or hydrogen peroxide residual. If operating in the ozone only mode, the reactor was allowed to circulate for an additional (after ozone dosing was complete) 180 seconds after which samples were collected and the reactor subsequently drained.

Turbidity and alkalinity were measured and recorded for the untreated water. After each test run, samples were immediately measured and recorded for dissolved ozone residual, temperature, and pH. After each test run, samples were collected for UVT (unquenched), total and fecal coliform (quenched), B-screen bioassay (quenched), and EDCs (quenched).

Total and fecal coliform analyses were performed by Chemtech-Ford Laboratories, B-screen bioassays were performed by Wisconsin State Laboratory Hygiene, and EDC analyses were performed by MWH Laboratories. Analytical results for both treated and untreated samples were provided.

Laboratory measurements were performed with the following equipment: The turbidity meter used was an Orbeco-Hellige Model 965-10 Serial #2222. The pH was measured with an Oakton Model Ph Tester 3+. Alkalinity was measured using a Hach Model 5-EP test kit. Ozone residual was measured with both Hach Model OZ-2 test kit and Hach Model Ozone AccuVac test kit.

Results of the test are summarized in FIG. 26. All Ozone Only Mode tests had a post-ozonation contact time of 180 seconds while all AOP Mode tests had no post-ozonation contact time. AOP Mode is a very fast reaction due to the high mixing efficiency and the fast reaction rate of the hydroxyl radical. It is clear that AOP Mode may result in significant reductions in reactor/contactor size and footprint.

Estradiol Equivalents

Figure 27:
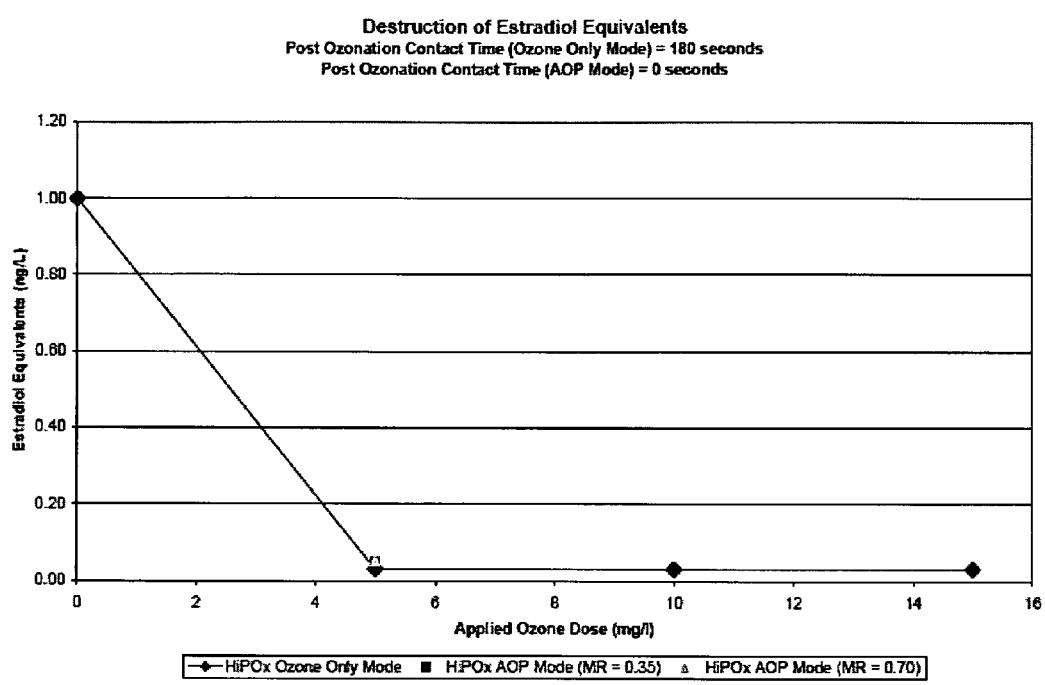
FIG. 27 is a graph showing the destruction response for Estradiol Equivalents as a function of ozone dose.

Dose response figures for estradiol equivalents are presented in FIG. 27. The concentration of Estradiol Equivalents in the untreated filtered effluent was reported to be 1.0 ng/L. From FIG. 27, a destruction dose-response curve for tertiary filtered effluent shows that an ozone dose of less than or equal to 5 mg/l was needed to achieve maximum removal (>97%) of Estradiol Equivalents. There was no observable difference in results between Ozone Only Mode and AOP Mode (at different hydrogen peroxide:ozone mole ratios). As shown in FIG. 26, all treated samples were reported below the detection limit for Estradiol Equivalents.

A sample was collected after dosing deionized water with ozone and hydrogen peroxide at normal operating conditions. As shown in FIG. 27, the treated deionized sample was reported below the detection limit for Estradiol Equivalents.

EDCs

Dose response figures for individual EDCs are presented in FIG. 28-36. The following EDCs were detected and reported in either the untreated or treated samples: Gemifibrozil, Ibuprofen, Triclosan, Caffeine, Fluoxetine, Sulfamethoxazole, Trimethoprim, Ethinyl Estradiol—17 Alpha, and Iopromide. In the case where a compound was reported below the detection limit, one-half the detection limit was used as the actual value for the data analysis.

Gemjfibrozil: The concentration of Gemifibrozil in the untreated filtered effluent was reported to be 116 ng/L. From FIG. 28, a destruction dose-response curve for tertiary filtered effluent shows that an ozone dose of less than or equal to 5 mg/l was needed to achieve maximum removal (>99%) of Gemifibrozil. There was no observable difference in results between Ozone Only Mode at an ozone dose of 5 mg/l and AOP Mode (ozone dose=5 mg/l, hydrogen peroxide:ozone mole ratios of 0.35 and 0.70). As shown in FIG. 26, all treated samples were reported below the detection limit of Gemifibrozil.

Figure 28:
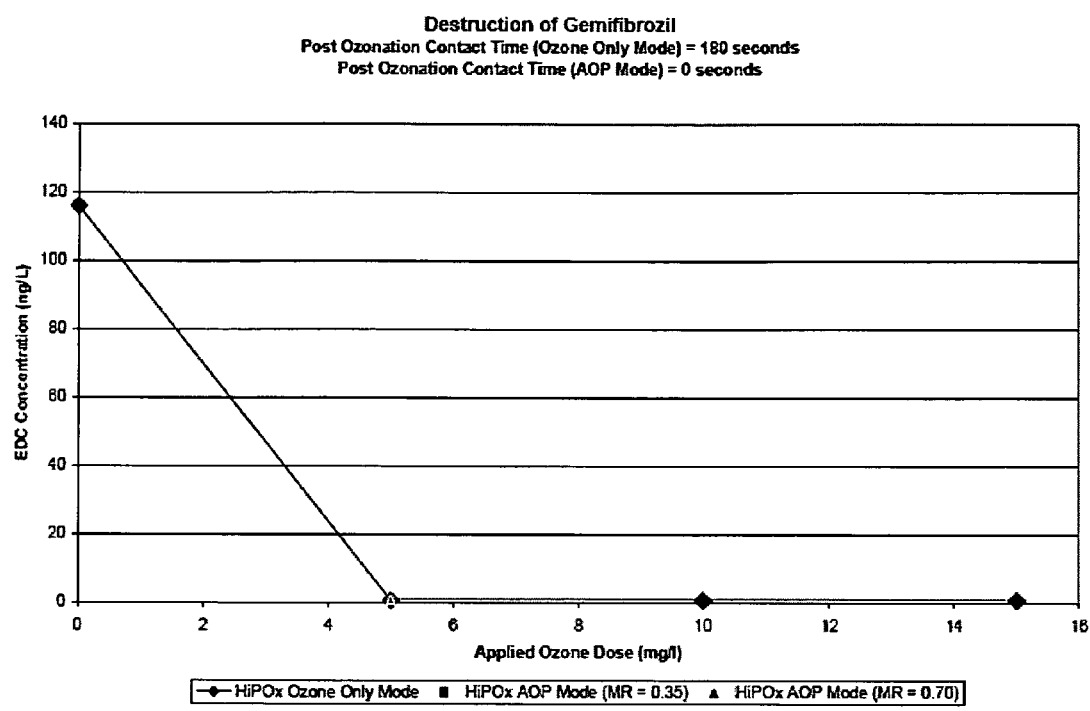
FIG. 28 is a graph showing the destruction response for Gemifibrozil as a function of ozone dose.
Figure 29:
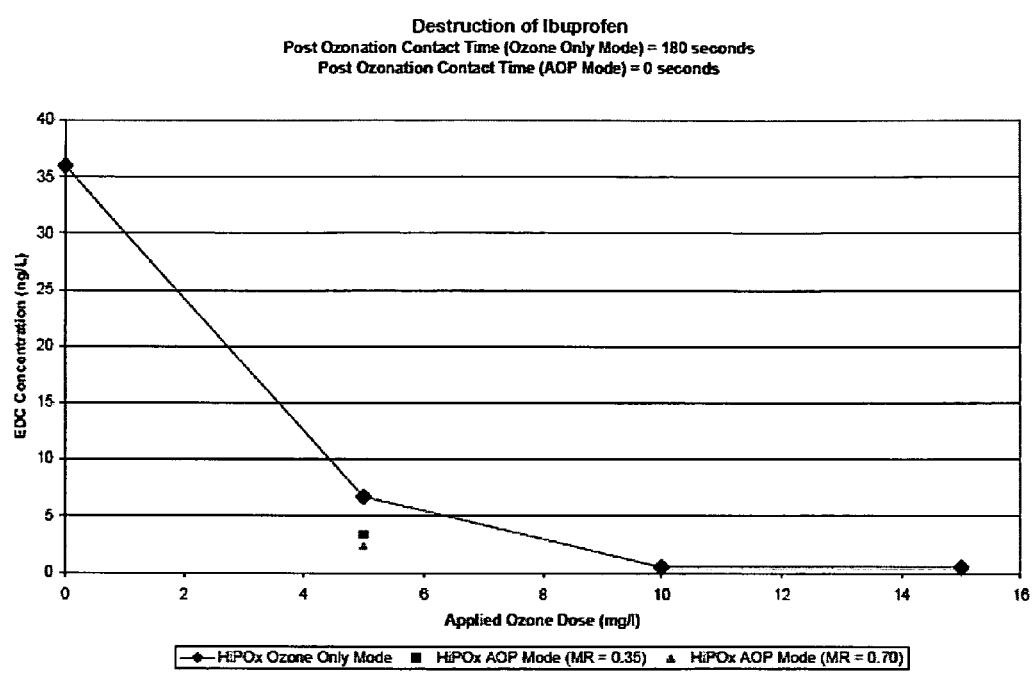
FIG. 29 is a graph showing the destruction response for Ibuprofen as a function of ozone dose.
Figure 30:
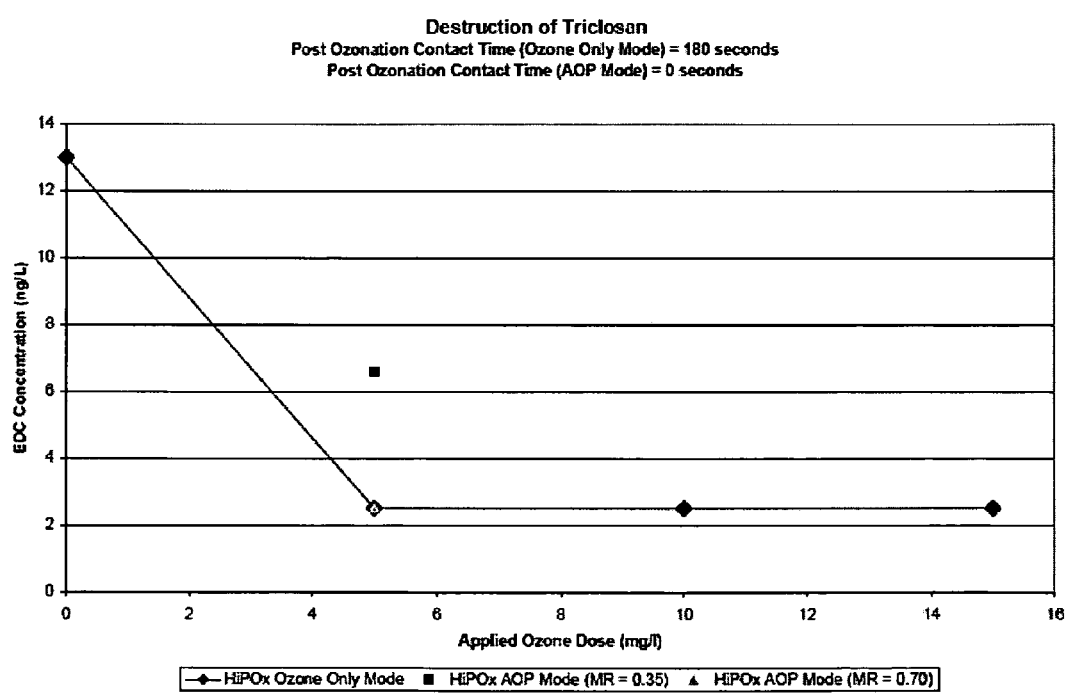
FIG. 30 is a graph showing the destruction response for Triclosan as a function of ozone dose.
Figure 31:
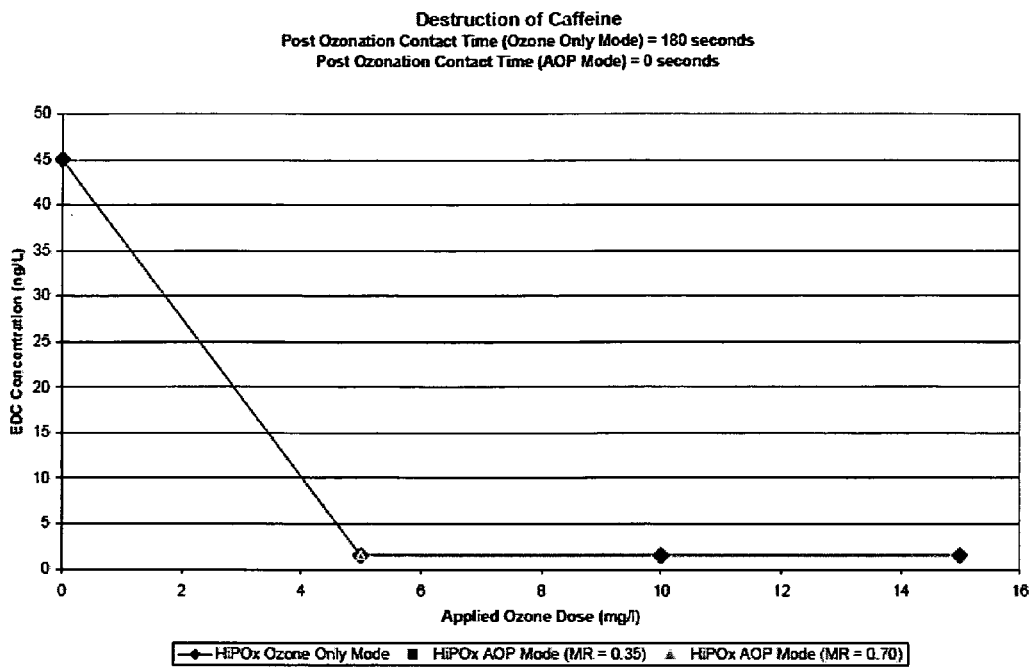
FIG. 31 is a graph showing the destruction response for Caffeine as a function of ozone dose.
Figure 32:
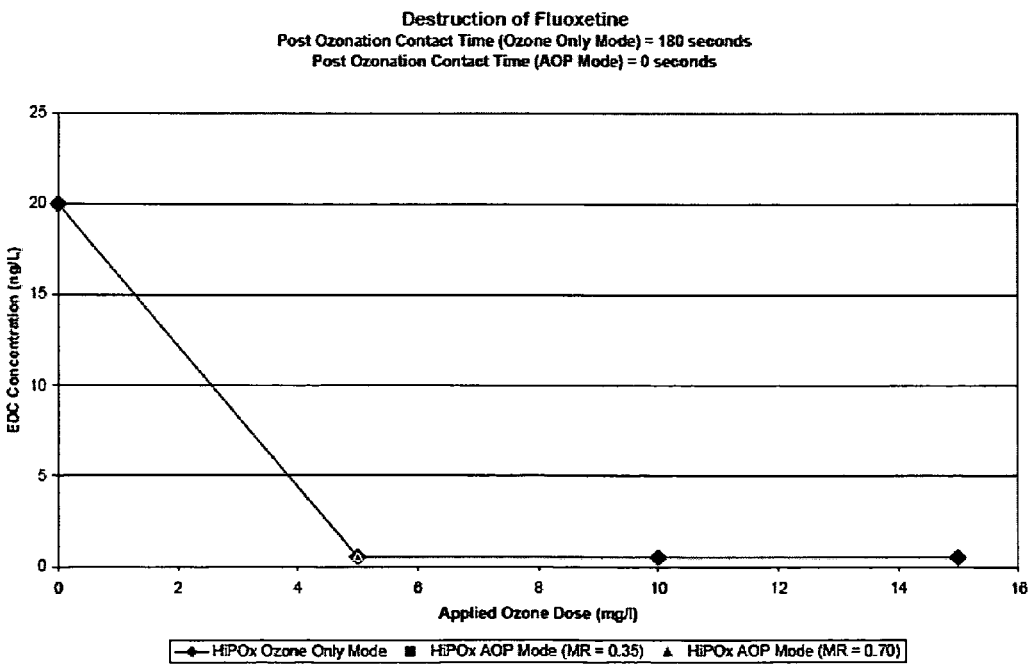
FIG. 32 is a graph showing the destruction response for Fluoxetine as a function of ozone dose.
Figure 33:
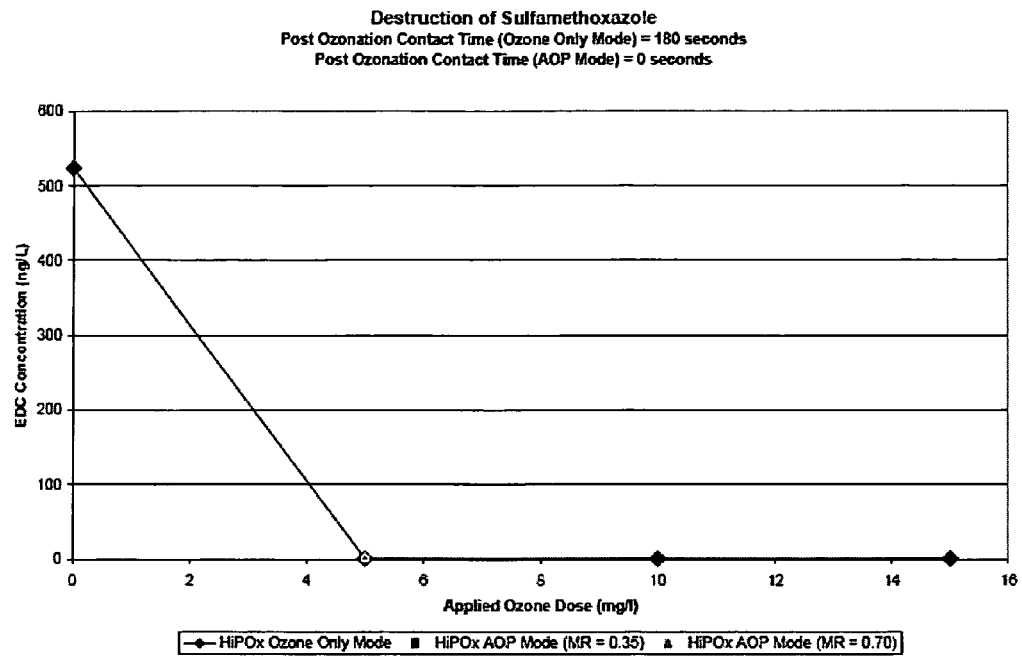
FIG. 33 is a graph showing the destruction response for Sulfamethoxazole as a function of ozone dose.
Figure 34:
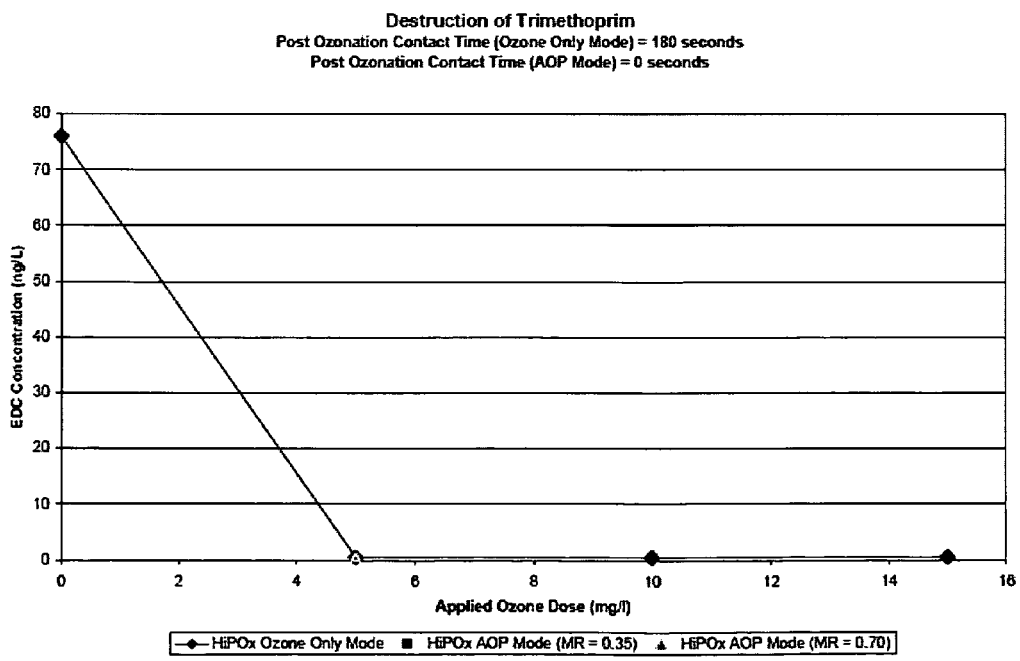
FIG. 34 is a graph showing the destruction response for Trimethoprim as a function of ozone dose.
Figure 35:
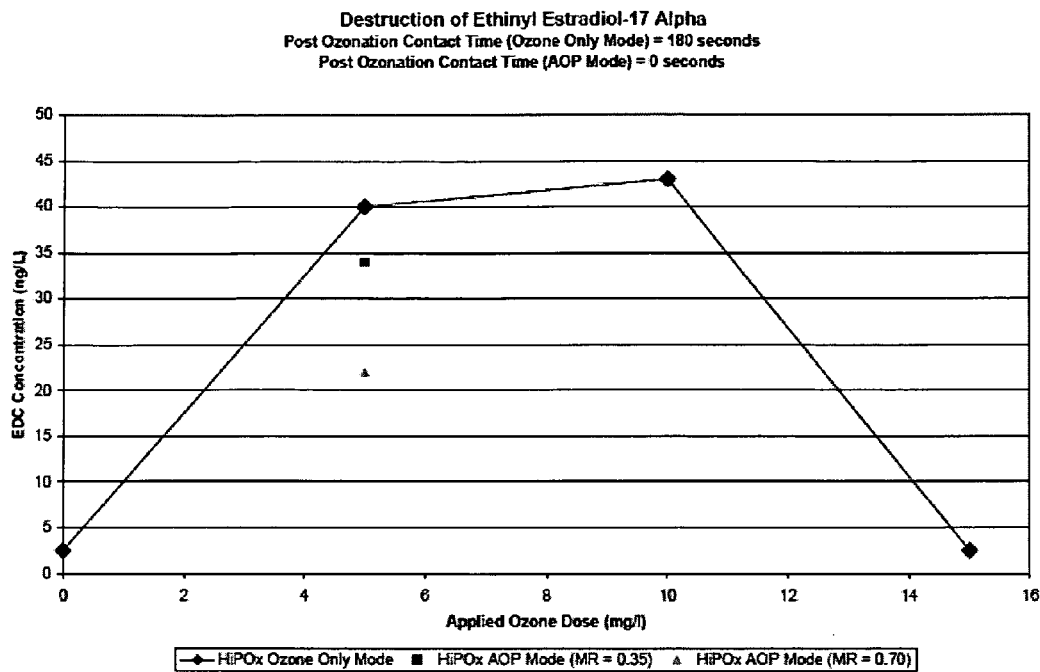
FIG. 35 is a graph showing the destruction response for Ethinyl Estradiol-17 Alpha as a function of ozone dose.
Figure 36:
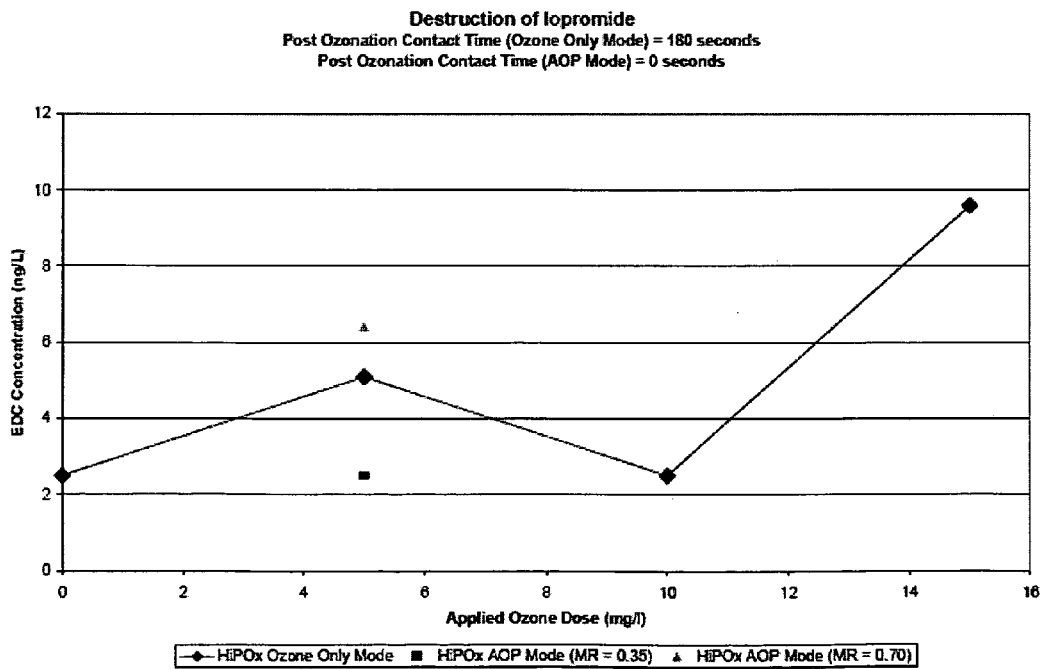
FIG. 36 is a graph showing the destruction response for Iopromide as a function of ozone dose.

A sample was collected after dosing deionized water with ozone and hydrogen peroxide at normal operating conditions. As shown in FIG. 28, the treated deionized sample was reported below the detection limit for Gemifibrozil.

Ibuprofen: The concentration of Ibuprofen in the untreated filtered effluent was reported to be 36 ng/1. From FIG. 29, a destruction dose-response curve for tertiary filtered effluent shows that an ozone dose of 5 mg/l achieved significant removal (~77%) of Ibuprofen and an ozone dose of less than or equal to 10 mg/l achieved maximum removal (>98%) of Ibuprofen. At an ozone dose of 5 mg/l, AOP Mode resulted in ~89% reduction at a mole ratio of 0.35 and ~92% reduction at a mole ratio of 0.70 relative to Ozone Only Mode reduction of ~77%. This may indicate that AOP Mode provides better destruction efficiency of Ibuprofen relative to Ozone Only Mode.

A sample was collected after dosing deionized water with ozone and hydrogen peroxide at normal operating conditions. As shown in FIG. 26, the treated deionized sample was reported below the detection limit for Ibuprofen.

Triclosan: The concentration of Triclosan in the untreated filtered effluent was reported to be 13 ng/L. From FIG. 30, a destruction dose-response curve for tertiary filtered effluent shows that an ozone dose of 5 mg/l achieved maximum removal (>76%) of Triclosan. There was no observable difference in results between Ozone Only Mode at an ozone dose of 5 mg/l and AOP Mode (ozone dose=5 mg/l, hydrogen peroxide:ozone mole ratio of 0.70). However, AOP Mode (ozone dose=5 mg/l, hydrogen peroxide:ozone mole ratio of 0.35) achieved only a 50% reduction of Triclosan. This result appears to contradict the trend of the data with no hydrogen peroxide and a mole ratio of 0.70; however, this may indicate that AOP Mode does not provide better destruction efficiency of Triclosan relative to Ozone Only Mode.

A sample was collected after dosing deionized water with ozone and hydrogen peroxide at normal operating conditions. As shown in FIG. 26, the treated deionized sample was reported below the detection limit for Triclosan.

Caffeine: The concentration of Caffeine in the untreated filtered effluent was reported to be 45 ng/L. From FIG. 31, a destruction dose-response curve for tertiary filtered effluent shows that an ozone dose of 5 mg/l achieved maximum removal (>96%) of Caffeine. There was no observable difference in results between Ozone Only Mode at an ozone dose of 5 mg/l and AOP Mode (ozone dose=5 mg/l, hydrogen peroxide:ozone mole ratios of 0.35 and 0.70). As shown in FIG. 26, all treated samples were reported below the detection limit for Caffeine.

A sample was collected after dosing deionized water with ozone and hydrogen peroxide at normal operating conditions. As shown in FIG. 26, the treated deionized sample was reported below the detection limit for Caffeine.

Fluoxetine: The concentration of Fluoxetine in the untreated filtered effluent was reported to be 20 ng/L. From FIG. 32, a destruction dose-response curve for tertiary filtered effluent shows that an ozone dose of 5 mg/l achieved maximum removal (>97%) of Fluoxetine. There was no observable difference in results between Ozone Only Mode at an ozone dose of 5 mg/l and AOP Mode (ozone dose=5 mg/l, hydrogen peroxide:ozone mole ratios of 0.35 and 0.70). As shown in FIG. 26, all treated samples were reported below the detection limit for Fluoxetine.

A sample was collected after dosing deionized water with ozone and hydrogen peroxide at normal operating conditions. As shown in FIG. 26, the treated deionized sample was reported below the detection limit for Fluoxetine.

Sulfamethoxazole: The concentration of Sulfamethoxazole in the untreated filtered effluent was reported to be 524 ng/L. From FIG. 33, a destruction dose-response curve for tertiary filtered effluent shows that an ozone dose of 5 mg/l achieved maximum removal (>99.9%) of Sulfamethoxazole. There was no observable difference in results between Ozone Only Mode at an ozone dose of 5 mg/l and AOP Mode (ozone dose=5 mg/l, hydrogen peroxide:ozone mole ratio of 0.35). However, AOP Mode (ozone dose=5 mg/l, hydrogen peroxide:ozone mole ratio of 0.70) achieved a slightly lower (>99.3%) reduction of Sulfamethoxazole. It is difficult to draw conclusions from such slight differences, but this may indicate that the mole ratio 0.70 was not as efficient as 0.35.

A sample was collected after dosing deionized water with ozone and hydrogen peroxide at normal operating conditions. As shown in FIG. 26, the treated deionized sample was reported below the detection limit for Sulfamethoxazole.

Trimethoprim: The concentration of Trimethoprim in the untreated filtered effluent was reported to be 76 ng/L. From FIG. 34, a destruction dose-response curve for tertiary filtered effluent shows that an ozone dose of 5 mg/l achieved maximum removal (>99%) of Trimethoprin. There was no observable difference in results between Ozone Only Mode at an ozone dose of 5 mg/l and AOP Mode (ozone dose=5 mg/l, hydrogen peroxide:ozone mole ratios of 0.35 and 0.70). As shown in FIG. 26, all treated samples were reported below the detection limit for Trimethoprim.

A sample was collected after dosing deionized water with ozone and hydrogen peroxide at normal operating conditions. As shown in FIG. 26, the treated deionized sample was reported below the detection limit for Trimethoprim.

Ethinyl Estradiol: The concentration of Ethinyl Estradiol in the untreated filtered effluent was reported below the detection limit of 5 ng/L. From FIG. 35, the destruction dose-response curve for tertiary filtered effluent indicates potential sampling or analytical error. It is difficult to draw conclusions from this data, but the destruction curve for Estradiol Equivalents (FIG. 28) clearly shows that estrogen related compounds were efficiently destroyed with Ozone Only Mode or AOP Mode.

A sample was collected after dosing deionized water with ozone and hydrogen peroxide at normal operating conditions. As shown in FIG. 26, the treated deionized sample was reported below the detection limit for Ethinyl Estradiol.

Iopromide: The concentration of Iopromide in the untreated filtered effluent was reported below the detection limit of 5 ng/L. From FIG. 36, the destruction dose-response curve for tertiary filtered effluent indicates potential sampling or analytical error. It is difficult to draw conclusions from this data.

A sample was collected after dosing deionized water with ozone and hydrogen peroxide at normal operating conditions. As shown in FIG. 26, the treated deionized sample was reported below the detection limit for Iopromide.

E. Coli

Figure 37:
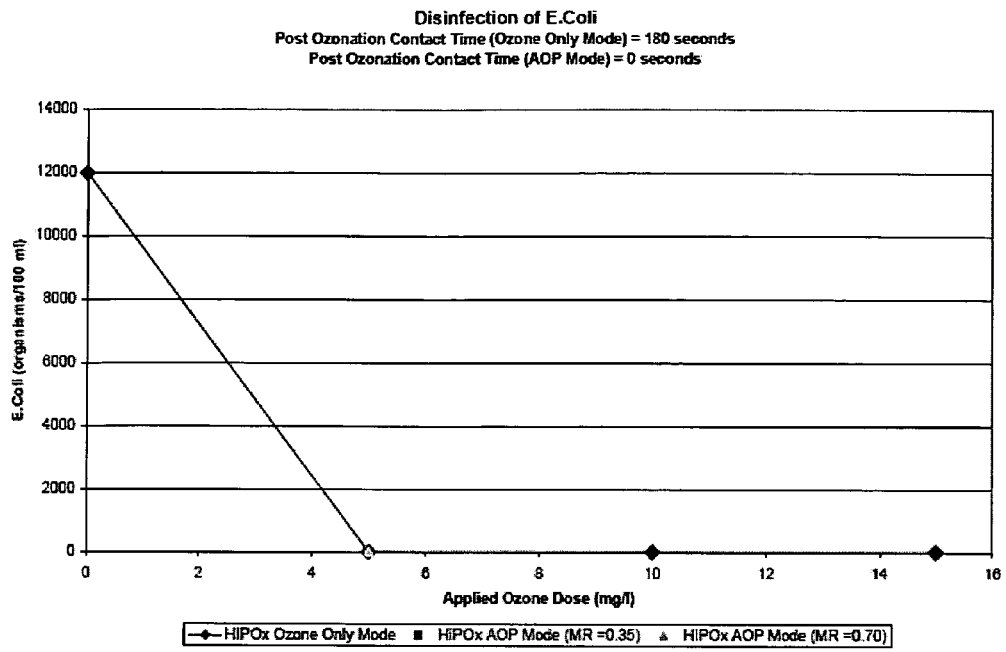
FIG. 37 is a graph showing the destruction response for E. Coli as a function of ozone dose.

Dose response figures for *E. Coli* are presented in FIG. 37. The concentration of *E. Coli* in the untreated filtered effluent was 12,000 organism/100 ml. From FIG. 37, the disinfection dose-response for tertiary filtered effluent shows than an ozone dose of less than or equal to 5 mg/l provided disinfection of *E. Coli*. to below the detection limit of 1 organism/100 ml. This was equivalent to greater than 4 log reduction of *E. Coli*. While AOP Mode also provided significant disinfection of *E. Coli*, there were low counts above the detection limit at an ozone dose of 5 mg/l with hydrogen peroxide:ozone mole ratios of 0.35 and 0.70. This may indicate that the lack of ozone residual (due to the use of hydrogen peroxide) and/or lack of contact time slightly impacted the disinfection efficiency of *E. Coli*.

Type I disinfection compliance in the State of Utah for water reuse requires a weekly median fecal coliform concentration limit of none detected, and no sample shall exceed 14 organisms/100 ml.

A sample was collected after dosing deionized water with ozone and hydrogen peroxide at normal operating conditions. As shown in FIG. 26, the treated deionized sample was reported below the detection limit for *E. Coli*.

UV Transmittance

Figure 38:
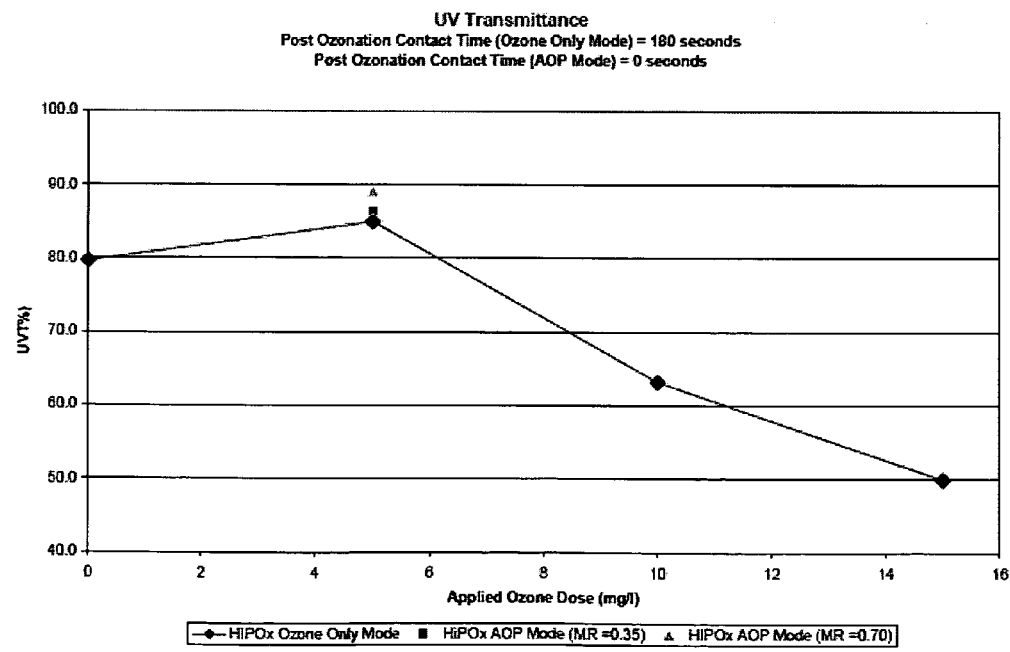
FIG. 38 is a graph showing the destruction response for UV Transmittance as a function of ozone dose.

Dose response figures for UV Transmittance are presented in FIG. 38. UV transmittance was measured to evaluate the impact of oxidation on this water quality parameter. In past experience, the UVT always increases with the addition of ozone and/or ozone/hydrogen peroxide and typically increases with increasing dosing levels. From FIG. 29, the increase in ozone dose during Ozone Only mode resulted in a 5.3% increase in UVT with an ozone dose of 5 mg/L. Unexpectedly, dosing levels of 10 mg/l and 15 mg/l resulted in decreases in UVT. At an ozone dose of 5 mg/L, AOP Mode increased the UVT by 6.7% at a hydrogen peroxide:ozone mole ratio of 0.35 and increased the UVT by 9.4% at a hydrogen peroxide:ozone mole ratio of 0.70. The data indicate that AOP Mode at an ozone dose of 5 mg/L resulted in more significant increases in UVT relative to Ozone Only Mode at an ozone dose of 5 mg/L.

The significance of this result may be result in better water clarity (as a general water quality indicator) or indicate that the present invention could be integrated upstream of UV to lessen the UV power requirement, reduced operating costs, and provide an additional barrier for EDCs and pathogens among other benefits.

Thus, the present invention is well adapted to carry out the objects and attain the benefits and advantages mentioned as well as those which are inherent therein.

Many modifications, features, and embodiments of the invention will become evident to those of ordinary skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes may be made therein without departing from the spirit and scope of the invention. It should also be understood that the invention is not restricted to the illustrated embodiments and that various modifications can be made.

What is claimed is:

1. An apparatus for removing contaminant from influent water, the apparatus comprising:
    a plurality of modules assembled into a water treatment reactor, the plurality of modules including:
    a main reactor comprising a diverter module, a first and second sidestream injector module, and at least one mixer module;
    a first sidestream comprising at least one injector module connected to a source of a first oxidant comprising ozone and a static mixer module, wherein the injector module is upstream of the mixer module;
    a second sidestream comprising at least one injector module connected to a source of a second oxidant comprising peroxide and a static mixer module, where the injector module is upstream of the mixer module;
    the diverter module fluidly connecting the main reactor and the first and second sidestreams, the diverter module effective to divert a portion of said influent water to the first and the second sidestream;
    the first sidestream injector module connected to the first sidestream for injecting influent water that is premixed with the first oxidant in said first sidestream;
    the second sidestream injector module connected to the second sidestream for injecting influent water that is premixed with the second oxidant in said second sidestream,
    at least one of the mixer modules comprising a static mixing component, and
    wherein the diverter module is attached upstream of the sidestream injector modules,
    the main reactor mixer module is attached downstream of the sidestream injector modules, and
    the sidestream injector modules and the main reactor mixer module are further adapted with fittings effective to allow the optional assembly of additional injector modules and additional mixer modules into the apparatus in a single-pass, plug flow configuration.

2. The apparatus of claim 1, wherein the first oxidant is ozone.

3. The apparatus of claim 1, wherein said hydrogen peroxide is premixed with a second portion of the influent water in said second sidestream.

4. The apparatus of claim 1, wherein the at least one mixer module of the main reactor comprises at least two mixer modules, a first mixer module attached downstream of the first injector module and a second mixer module attached downstream of the second injector module.

5. The apparatus of claim 1, wherein the second injector module is located upstream of the first injector module.

6. The apparatus of claim 1, wherein the second injector module is located downstream of the first injector module.

7. The apparatus of claim 1, wherein the static mixing component is selected from a mixing component comprising a vane and a mixing component comprising one or more tabs.

8. The apparatus of claim 1, the second sidestream further comprising a pre-mix module upstream of the injector and mixing modules.

9. The apparatus of claim 8, wherein the pre-mix module is connected to a source of hydrogen peroxide.

10. The apparatus of claim 1, at least one of the first or second sidestream further comprising a post-mix module downstream of the injector and mixing modules.

11. The apparatus of claim 1, wherein said injector module and said mixer module of the first sidestream or the injector module and said mixer module of the second sidestream share a common housing.

12. The apparatus of claim 1, at least one of the first or second sidestream comprising a plurality of injector modules and a plurality of mixer modules in an alternating arrangement.

13. The apparatus of claim 1, wherein each injector module includes at least one injector.

14. The apparatus of claim 1, wherein each injector module includes a plurality of injectors arranged to maximize the dissolution of the oxidant premixed in the sidestream.

15. A sidestream-containing apparatus for removing a contaminant from influent water, the apparatus comprising:
    a first plurality of modules assembled into a main reactor in the apparatus, the first plurality of modules comprising:
    a diverter module effective to divert a portion of said influent water to a first sidestream and a second sidestream;
    a first sidestream injector module connected to said first sidestream for injecting influent water from the first sidestream into the main reactor,
    a second sidestream injector module downstream of the diverter module and connected to said second sidestream for injecting influent water from the second sidestream into the main reactor,
    at least one mixer module comprising a static mixing component,
    a second plurality of modules assembled into said first sidestream, the second plurality of modules comprising:
    at least one injector module connected to a source of a first oxidant comprising ozone, at least one mixer module comprising a static mixing component, and
conduits effective to introduce oxidant premixed with influent water in said first sidestream into the first sidestream injector module of said main reactor, and
a third plurality of modules assembled into said second sidestream, the third plurality of modules comprising:
at least one injector module connected to a source of a second oxidant comprising peroxide,
at least one mixer module comprising a static mixing component, and
conduits effective to introduce oxidant premixed with influent water in said second sidestream into the second sidestream injector module of said main reactor,
wherein said modules are adapted with fittings effective to allow the installation of additional optional injector modules and/or mixer modules to the first sidestream, the second sidestream, and/or the main reactor.

* * * * *